United States Patent
Kawasaki et al.

(10) Patent No.: US 11,064,541 B2
(45) Date of Patent: Jul. 13, 2021

(54) TERMINAL APPARATUS, MOBILITY MANAGEMENT ENTITY (MME), AND COMMUNICATION CONTROL METHOD

(71) Applicant: SHARP KABUSHIKI KAISHA, Sakai (JP)

(72) Inventors: Yudai Kawasaki, Sakai (JP); Masafumi Aramoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 17 days.

(21) Appl. No.: 15/998,750

(22) PCT Filed: Feb. 15, 2017

(86) PCT No.: PCT/JP2017/005593
§ 371 (c)(1),
(2) Date: Aug. 16, 2018

(87) PCT Pub. No.: WO2017/141992
PCT Pub. Date: Aug. 24, 2017

(65) Prior Publication Data
US 2020/0252979 A1    Aug. 6, 2020

(30) Foreign Application Priority Data
Feb. 16, 2016 (JP) .............................. JP2016-026666

(51) Int. Cl.
*H04W 76/10* (2018.01)
*H04W 76/30* (2018.01)
(52) U.S. Cl.
CPC ........... *H04W 76/10* (2018.02); *H04W 76/30* (2018.02)

(58) Field of Classification Search
CPC ..... H04W 76/10; H04W 76/11; H04W 76/12; H04W 76/15; H04W 76/19; H04W 76/30; H04W 76/32; H04W 76/34; H04W 76/36
See application file for complete search history.

(56) References Cited

U.S. PATENT DOCUMENTS

| | | | |
|---|---|---|---|
| 8,687,592 B2* | 4/2014 | Cheon ............... | H04W 36/0033 370/331 |
| 2005/0185664 A1* | 8/2005 | Chaskar ............... | H04L 69/165 370/445 |

(Continued)

FOREIGN PATENT DOCUMENTS

| | | |
|---|---|---|
| JP | 2012-514955 A | 6/2012 |
| WO | WO 2012/050841 A1 | 4/2012 |

(Continued)

OTHER PUBLICATIONS

LG Electronics, New solution "Two layers Tracking Area handling for CIoT", SA WG2 Meeting S2#110AH, S2-152783, Sophia Antipolis, France, Aug. 31-Sep. 3, 2015, total 5 pages.

(Continued)

*Primary Examiner* — Kevin D Mew
(74) *Attorney, Agent, or Firm* — Birch, Stewart, Kolasch & Birch, LLP.

(57) ABSTRACT

First identification information is information indicating a Mobility Type supported by a core network, and second identification information is information indicating a Mobility Type allowed by the core network. A communication control method for a terminal apparatus of the present invention includes a step of receiving an ACTIVATE DEFAULT EPS BEARER CONTEXT REQUEST message from the core network via a base station apparatus, the ACTIVATE DEFAULT EPS BEARER CONTEXT REQUEST message including at least the first identification information and/or the second identification information.

(Continued)

Accordingly, there is provided a communication procedure that is suited to the determination of a Mobility Type of a terminal.

8 Claims, 23 Drawing Sheets

(56) References Cited

U.S. PATENT DOCUMENTS

| | | |
|---|---|---|
| 2010/0208698 A1 | 8/2010 | Lu et al. |
| 2011/0171953 A1 | 7/2011 | Faccin et al. |
| 2011/0182268 A1* | 7/2011 | Akhtar ............... H04W 36/0022 370/331 |
| 2012/0076121 A1* | 3/2012 | Choi ................... H04W 60/005 370/338 |
| 2012/0184266 A1 | 7/2012 | Faccin et al. |
| 2012/0246325 A1* | 9/2012 | Pancorbo Marcos ....................... H04L 63/102 709/227 |
| 2012/0257598 A1* | 10/2012 | Karampatsis ......... H04W 8/082 370/331 |
| 2012/0269167 A1* | 10/2012 | Velev ................ H04W 36/0011 370/331 |
| 2013/0155959 A1* | 6/2013 | Ikeda .................... H04W 88/08 370/328 |
| 2013/0182644 A1* | 7/2013 | Kim ...................... H04W 76/15 370/328 |
| 2013/0308527 A1* | 11/2013 | Chin ..................... H04W 36/38 370/328 |
| 2014/0341148 A1 | 11/2014 | Keskitalo et al. |
| 2015/0195743 A1* | 7/2015 | Sirotkin ................ H04W 36/14 370/235 |
| 2015/0223133 A1* | 8/2015 | Stojanovski ......... H04B 7/0456 370/230 |
| 2016/0198516 A1* | 7/2016 | Kim ...................... H04L 12/189 370/312 |
| 2016/0380802 A1* | 12/2016 | Kunz .................... H04W 76/19 370/216 |
| 2017/0339725 A1* | 11/2017 | Cho ....................... H04W 76/10 |
| 2018/0191493 A1* | 7/2018 | Huang ................. H04L 63/0281 |
| 2020/0137641 A1* | 4/2020 | Chauhan ............... H04W 36/14 |

FOREIGN PATENT DOCUMENTS

| | | |
|---|---|---|
| WO | WO 20121135467 A1 | 10/2012 |
| WO | WO 20141066833 A1 | 5/2014 |

OTHER PUBLICATIONS

LTE Advanced Pro, "3rd Generation Partnership Project; Technical Specification Group Services and System Aspects; Study on Architecture for Next Generation System (Release 14)", Technical Report, 3GPP TR 23.799, V0.2.0, (Feb. 2016), total 17 pages.

* cited by examiner (b)

| |
|---|
| IMSI |
| IMSI-unauthenticated-indicator |
| MSISDN |
| MM State |
| GUTI |
| ME Identity |
| Tracking Area List |
| TAI of last TAU |
| ECGI |
| E-UTRAN Cell Identity Age |
| CSG ID |
| CSG membership |
| Access mode |
| Authentication Vector |
| UE Radio Access Capability |
| MS Classmark 2 |
| MS Classmark 3 |
| Supported Codecs |
| UE Network Capability |
| MS Network Capability |
| UE Specific DRX Parameters |
| Selected NAS Algorithm |
| eKSI |
| K_ASME |
| NAS Keys and COUNT |
| Selected CN operator id |

| Recovery |
|---|
| Access Restriction |
| ODB for PS parameters |
| APN-OI Replacement |
| MME IP address for S11 |
| MME TEID for S11 |
| S-GW IP address for S11/S4 |
| S-GW TEID for S11/S4 |
| SGSN IP address for S3 |
| SGSN TEID for S3 |
| eNodeB Address in Use for S1-MME |
| eNB UE S1AP ID |
| UE S1AP ID |
| Subscribed UE-AMBR |
| UE-AMBR |
| EPS Subscribed Charging Characteristics |
| Subscribed RFSP Index |
| RFSP Index in Use |
| Trace reference |
| Trace type |
| Trigger id |
| OMC identity |
| URRP-MME |
| CSG Subscription Data |
| LIPA Allowed |

| MPS CS priority |
| --- |
| MPS EPS priority |
| Voice Support Match Indicator |
| Homogenous Support of IMS Voice over PS Sessions |

| APN in Use |
| --- |
| APN Restriction |
| APN Subscribed |
| PDN Type |
| IP Address(es) |
| EPS PDN Charging Characteristic |
| APN-OI Replacement |
| SIPTO permissions |
| Local Home Network ID |
| LIPA permissions |
| WLAN offloadability |
| VPLMN Address Allowed |
| PDN GW Address in Use (CONTROL INFORMATION) |
| PDN GW TEID for S5/S8 (CONTROL INFORMATION) |
| MS Info Change Reporting Action |
| CSG Information Reporting Action |
| Presence Reporting Area Action |
| EPS subscribed QoS profile |
| Subscribed APN-AMBR |
| APN-AMBR |
| PDN GW GRE Key for uplink traffic (USER DATA) |
| Default bearer |
| low access priority |

| EPS Bearer ID |
| --- |
| TI |
| S-GW IP address for S1-u |
| S-GW TEID for S1u |
| PDN GW TEID for S5/S8 (user plane) |
| PDN GW IP address for S5/S8 (user plane) |
| EPS bearer QoS |
| TFT |

FIG. 11

(e)
| EPS AS SECURITY CONTEXT |
| --- |
| EPS NAS SECURITY CONTEXT |

(f)
| cryptographic key |
| --- |
| Next Hop parameter (NH) |
| Next Hop Chaining Counter parameter (NCC) |
| identifiers of the selected AS level cryptographic algorithms |

(g)
| K_ASME |
| --- |
| UE security capabilitie |
| NAS COUNT |

(h)
| Emergency Access Point Name (em APN) |
| --- |
| Emergency QoS profile |
| Emergency APN-AMBR |
| Emergency PDN GW identity |
| Non-3GPP HO Emergency PDN GW identity |

| |
|---|
| IMSI |
| IMSI-unauthenticated-indicator |
| ME Identity |
| MSISDN |
| Selected CN operator id |
| MME TEID for S11 |
| MME IP address for S11 |
| S-GW TEID for S11/S4 |
| S-GW IP address for S11/S4 |
| SGSN IP address for S4 |
| SGSN TEID for S4 |
| Trace reference |
| Trace type |
| Trigger ID |
| OMC identity |
| Last known Cell ID |
| Last known Cell ID age |

| APN in Use |
| --- |
| EPS PDN Charging Characteristics |
| P-GW Address in Use (CONTROL INFORMATION) |
| P-GW TEID for S5/S8 (CONTROL INFORMATION) |
| P-GW Address in Use (USER DATA) |
| P-GW GRE Key for uplink traffic (USER DATA) |
| S-GW IP address for S5/S8 (CONTROL INFORMATION) |
| S-GW TEID for S5/S8 (CONTROL INFORMATION) |
| S-GW Address in Use (USER DATA) |
| S-GW GRE Key for downlink traffic (USER DATA) |
| Default Bearer |

(d)

| EPS Bearer Id |
| --- |
| TFT |
| P-GW Address in Use (user plane) |
| S-GW IP address for S5/S8 (user plane) |
| S-GW TEID for S5/S8 (user plane) |
| S-GW IP address for S1-u, S12 and S4 (user plane) |
| S-GW TEID for S1-u, S12 and S4 (user plane) |
| eNodeB IP address for S1-u |
| eNodeB TEID for S1-u |
| RNC IP address for S12 |
| RNC TEID for S12 |
| SGSN IP address for S4 (user plane) |
| SGSN TEID for S4 (user plane) |
| EPS Bearer QoS |
| Charging Id |

| IMSI |
| IMSI-unauthenticated-Indicator |
| ME Identity |
| MSISDN |
| Selected CN operator id |
| RAT type |
| Trace reference |
| Trace type |
| Trigger id |
| OMC identity |

(c)

| APN in use |
| APN-AMBR |

(d)

| IP Address |
| --- |
| PDN type |
| S-GW Address in Use (CONTROL INFORMATION) |
| S-GW TEID for S5/S8 (CONTROL INFORMATION) |
| S-GW Address in Use (USER DATA) |
| S-GW GRE Key for downlink traffic (USER DATA) |
| P-GW IP address for S5/S8 (CONTROL INFORMATION) |
| P-GW TEID for S5/S8 (CONTROL INFORMATION) |
| P-GW Address in Use (USER DATA) |
| P-GW GRE Key for uplink traffic (USER DATA) |
| MS Info Change Reporting support indication |
| MS Info Change Reporting Action |
| CSG Information Reporting Action |
| Presence Reporting Area Action |
| BCM |
| Default Bearer |
| Default BearerEPS PDN Charging Characteristics |

| EPS Bearer Id |
| --- |
| TFT |
| S-GW Address in Use (USER DATA) |
| S-GW TEID for S5/S8 (USER DATA) |
| P-GW IP address for S5/S8 (USER DATA) |
| P-GW TEID for S5/S8 (USER DATA) |
| EPS Bearer QoS |
| Charging Id |

| IMSI |
|---|
| EMM State |
| GUTI |
| ME Identity |
| Tracking Area List |
| last visited TAI |
| Selected NAS Algorithm |
| Selected AS Algorithm |
| eKSI |
| K_ASME |
| NAS Keys and COUNT |
| Temporary Identity used in Next update (TIN) |
| UE Specific DRX Parameters |
| Allowed CSG list |
| Operator CSG list |

(c)

| APN in Use |
|---|
| APN AMBR |
| Assigned PDN Type |
| IP Address(es) |
| Default Bearer |
| WLAN offloadability |

(d)

| EPS Bearer ID |
|---|
| TI |
| EPS bearer QoS |
| TFT |

TERMINAL APPARATUS, MOBILITY MANAGEMENT ENTITY (MME), AND COMMUNICATION CONTROL METHOD

TECHNICAL FIELD

The present invention relates to a terminal apparatus, a Mobility Management Entity (MME), and a communication control method.

BACKGROUND ART

The 3rd Generation Partnership Project (3GPP), which undertakes activities for standardizing recent mobile communication systems, discusses System Architecture Enhancement (SAE), which is system architecture of the Long Term Evolution (LTE). 3GPP is in the process of creating specifications for the Evolved Packet System (EPS) as a communication system that realizes an all-IP architecture. Note that a core network constituting EPS is called an Evolved Packet Core (EPC).

Further, in 3GPP, Architecture for Next Generation System (NexGen) discusses recently as a next-generation communication technique designed for a diversity of terminals. In the NexGen, technical problems of connecting a diversity of terminals to a cellular network are extracted and solutions for the problems are issued as specifications.

For example, optimization of a communication procedure for a terminal requiring high-speed communication, or optimization of a communication procedure for a terminal for which efficiency in power consumption needs to be enhanced to enable a battery to be maintained for several years, may be given as examples of required conditions.

Further, optimization or diversification of mobility for simultaneously supporting terminals with a low movement frequency, such as fixed terminals, and terminals with a high movement frequency, such as terminals provided in vehicles or the like, may also be given as examples of required conditions.

CITATION LIST

Non Patent Literature

NPL 1: 3rd Generation Partnership Project; Technical Specification Group Services and System Aspects; Study on Architecture for Next Generation System (Release 14)

SUMMARY OF INVENTION

Technical Problem

In the NexGen, discussions are underway for optimization of terminal mobility.

More specifically, discussions are underway to provide mobility of a granularity suitable for a terminal through diversification of a granularity of terminal mobility.

However, procedure steps for selecting a granularity of terminal mobility or a granularity of mobility suitable for a terminal, or means for changing a granularity of mobility has not yet been specified.

The present invention has been made in consideration of these circumstances, and an object of the present invention is to provide communication control means that provides mobility suitable for terminals and communication paths.

Solution to Problem

In order to achieve the object mentioned above, a communication control method for a terminal apparatus of the present invention includes the step of, given that first identification information is information indicating a Mobility Type supported by a core network, and second identification information is information indicating a Mobility Type allowed by the core network: receiving a first ACTIVATE DEFAULT EPS BEARER CONTEXT REQUEST message from the core network via a base station apparatus, the first ACTIVATE DEFAULT EPS BEARER CONTEXT REQUEST message including at least the first identification information and/or the second identification information.

Moreover, a communication control method for a Mobility Management Entity (MME) of the present invention includes the step of, given that first identification information is information indicating a Mobility Type supported by a core network, and second identification information is information indicating a Mobility Type allowed by the core network: transmitting a first ACTIVATE DEFAULT EPS BEARER CONTEXT REQUEST message to a terminal apparatus via a base station apparatus, the first ACTIVATE DEFAULT EPS BEARER CONTEXT REQUEST message including at least the first identification information and/or the second identification information.

Moreover, a terminal apparatus of the present invention includes, given that first identification information is information indicating a Mobility Type supported by a core network, and second identification information is information indicating a Mobility Type allowed by the core network: a transmission and/or reception unit configured to receive an ATTACH ACCEPT message from the core network via a base station apparatus, the ATTACH ACCEPT message including at least the first identification information and/or the second identification information.

Moreover, a Mobility Management Entity (MME) of the present invention includes, given that first identification information is information indicating a Mobility Type supported by a core network, and second identification information is information indicating a Mobility Type allowed by the core network: a transmission and/or reception unit configured to transmit a first ACTIVATE DEFAULT EPS BEARER CONTEXT REQUEST message to a terminal apparatus via a base station apparatus, the first ACTIVATE DEFAULT EPS BEARER CONTEXT REQUEST message including at least the first identification information and/or the second identification information.

Advantageous Effects of Invention

According to the present invention, a terminal can establish a connectivity according to a mobility capability. In addition, a core network can establish connections for terminals having different mobility capabilities or establish communication paths having different mobility capabilities.

BRIEF DESCRIPTION OF DRAWINGS

FIGS. 2A and 2B are diagrams illustrating an example of a configuration of an IP mobile communication network, and the like.

FIGS. 3A and 3B are diagrams illustrating an example of a configuration of an IP mobile communication network, and the like.

FIG. 7 is a diagram illustrating a storage unit of the MME.

FIG. 8 is a diagram illustrating the storage unit of the MME.

FIG. 9 is a diagram illustrating the storage unit of the MME.

FIG. 10 is a diagram illustrating the storage unit of the MME.

FIG. 11 is a diagram illustrating the storage unit of the MME.

FIG. 12 is a diagram illustrating the storage unit of the MME.

FIG. 14 is a diagram illustrating a storage unit of the SGW.

FIG. 15 is a diagram illustrating the storage unit of the SGW.

FIG. 18 is a diagram illustrating the storage unit of the PGW.

FIG. 19 is a diagram illustrating the storage unit of the PGW.

FIG. 21 is a diagram illustrating a storage unit of the UE.

DESCRIPTION OF EMBODIMENTS

Hereinafter, a preferred embodiment for carrying out the present invention will be described with reference to the drawings. Note that as an example, the present embodiment describes an embodiment of a mobile communication system to which the present invention is applied.

1. Embodiment 1.1. System Overview

Figure 1:
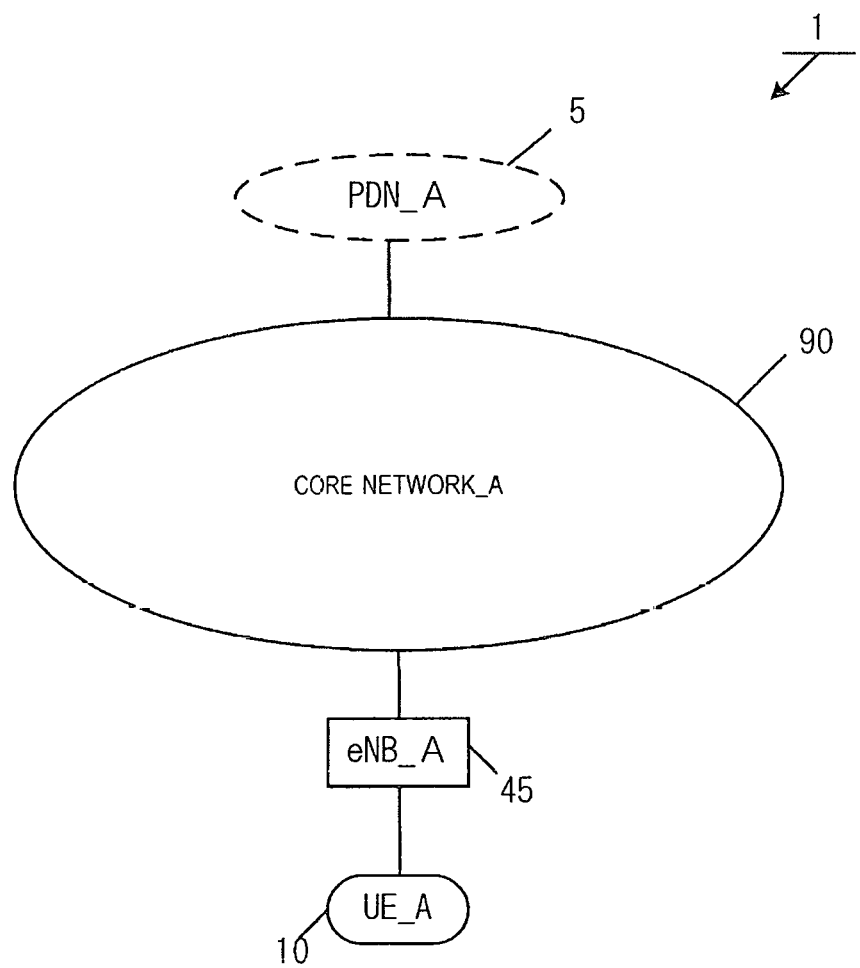
FIG. 1 is a diagram illustrating an overview of a mobile communication system.

FIG. 1 is a diagram illustrating an overview of a mobile communication system according to the present embodiment. As illustrated in FIG. 1, a mobile communication system 1 includes a mobile terminal apparatus UE A 10, an eNB_A 45, a core network_A 90, and a PDN_A 5.

Here, the UE_A 10 may be any wirelessly connectable terminal apparatus, and may be a User equipment (UE), a Mobile equipment (ME), or a Mobile Station (MS).

Alternatively, the UE_A 10 may be a CIoT terminal. Note that the CIoT terminal is an IoT terminal connectable to the core network A 90, where the IoT terminal includes a mobile phone terminal such as a smartphone and may be a variety of IT equipment such as a personal computer or sensor devices.

In other words, in a case that the UE_A 10 is the CIoT terminal, the UE_A 10 may request a connection optimized for the CIoT terminal, based on a policy of the UE_A 10 or a request from the network, or may request the known connection. Alternatively, the UE_A 10 may be configured as a terminal apparatus which connects to the core network_A 90 only by a communication procedure optimized for the CIoT terminal beforehand at the time of shipping.

Here, the core network_A 90 refers to an IP mobile communication network run by a Mobile Operator.

For example, the core network_A 90 may be a core network for the mobile operator that runs and manages the mobile communication system 1, or may be a core network for a virtual mobile operator such as a Mobile Virtual Network Operator (MVNO). Alternatively, the core network_A 90 may be a core network for accommodating the CIoT terminal.

Additionally, the eNB_A 45 is a base station constituting a radio access network used by the UE_A 10 to connect to the core network_A 90. In other words, the UE_A 10 connects to the core network_A 90 by using the eNB_A 45.

Additionally, the core network_A 90 is connected to the PDN_A 5. The PDN_A 5 is a packet data service network which provides a communication service to the UE_A 10, and may be configured for each of services. A communication terminal is connected to the PDN, the UE_A 10 can transmit and/or receive user data to/from the communication terminal located in the PUN A 5.

Note that the user data may be data transmitted and/or received between the UE_A 10 and a device included in the PDN_A 5. Note that the UE_A 10 transmits the user data to the PDN_A 5 via the core network_A 90. In other words, the UE_A 10 transmits and/or receives the user data to/from the core network_A 90 in order to transmit and/or receive the user data to/from the PDN_A5. More specifically, the UE_A 10 transmits and/or receives the user data to/from a gateway device in the core network_A 90, such as a PGW_A 30 and a C-SGN_A 95, in order to transmit and/or receive the user data to/from the PDN_A5.

Next, an example of a configuration of the core network_A 90 will be described. In the present embodiment, two configuration examples of the core network_A 90 will be described.

Figure 2A:
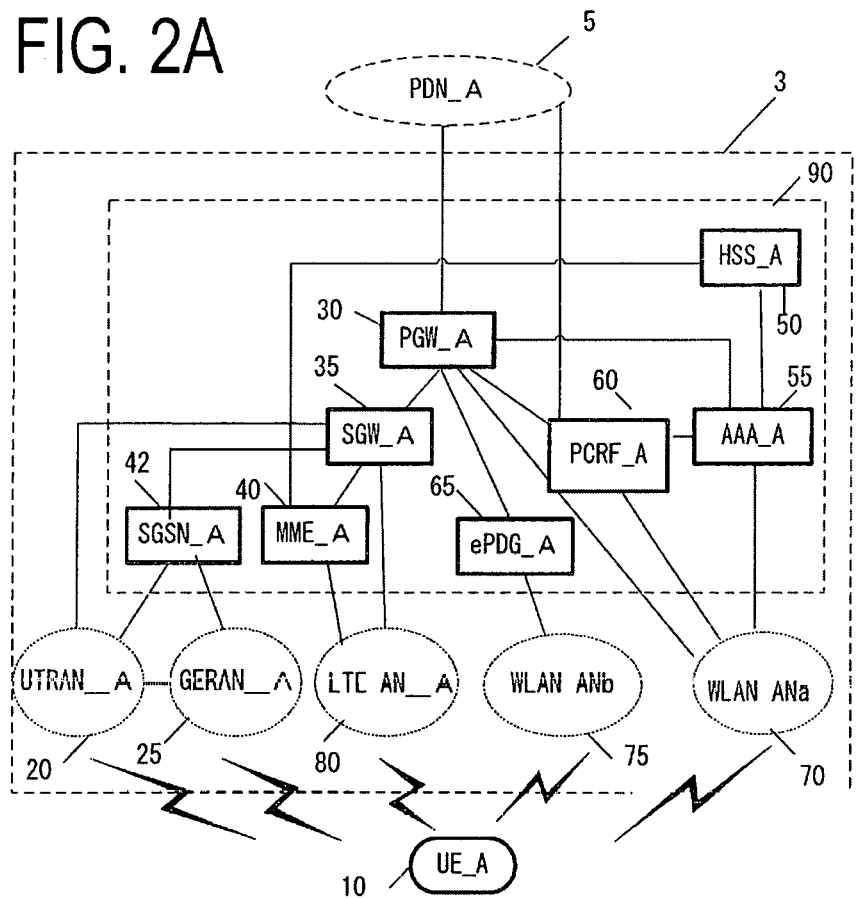
Figure 2B:
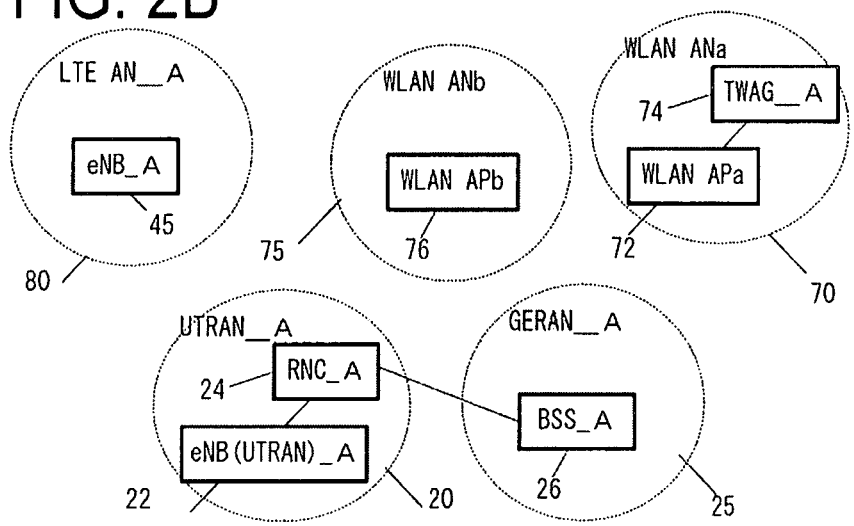

FIGS. 2A and 2B illustrate an example of the configuration of the core network_90. The core network_A 90 in FIG. 2A includes a Home Subscriber Server (HSS)_A 50, an Authentication, Authorization, Accounting (AAA)_A 55, a Policy and Charging Rules Function (PCRF)_A 60, a Packet Data Network Gateway (PGW)_A 30, an enhanced Packet Data Gateway (ePDG)_A 65, a Serving Gateway (SGW)_A 35, a Mobility Management Entity (MME)_A 40, and a Serving GPRS Support Node (SGSN)_A 42.

Furthermore, the core network_A 90 is capable of connecting to multiple radio access networks (an LTE AN_A 80, a WLAN ANb 75, a WLAN ANa 70, a UTRAN_A 20, and a GERAN_A 25).

Such a radio access network may be configured by connecting to multiple different access networks, or may be configured by connecting to either one of the access networks. Moreover, the UE_A 10 is capable of wirelessly connecting to the radio access network.

Moreover, a WLAN Access Network b (WLAN ANb 75) that connects to the core network via the ePDG_A 65 and a WLAN Access Network a (WLAN ANa 75) that connects to the PGW_A, the PCRF_A 60, and the AAA_A 55 can be configured as access networks connectable in a WLAN access system.

Note that each device has a similar configuration to those of the devices of the related art in a mobile communication system using EPS, and thus detailed descriptions thereof will be omitted. Each device will be described briefly hereinafter.

The PGW_A 30 is connected to the PDN_A 5, an SGW_A 35, the ePDG_A 65, the WLAN ANa 70, the PCRF_A 60, and the AAA_A 55 and is a relay device configured to transfer user data by functioning as a gateway device between the PDN_A 5 and the core network_A 90.

The SGW_A 35 is connected to the PGW 30, the MME_A 40, the LTE AN 80, the SGSN_A 42, and the UTRAN_A 20, and serves as a relay device configured to transfer user data by functioning as a gateway device between the core network_A 90 and the 3GPP access network (the UTRAN_A 20, the GERAN_A 25, the LTE AN_A 80).

The MME_A 40 is connected to the SGW_A 35, the LTE AN 80, and the HSS_A 50, and serves as an access control device configured to perform location information management and access control for the UE_A 10 via the LTE AN 80. Furthermore, the core network_A 90 may include multiple location management devices. For example, a location management device different from the MME_A 40 may be configured. As with the MME_A 40, the location management device different from the MME_A 40 may be connected to the SGW_A 35, the LTE AN 80, and the HSS_A 50.

Furthermore, in a case that multiple MMEs are included in the core network_A 90, the MMEs may be connected to each other. With this configuration, the context of the UE_A 10 may be transmitted and/or received between the MMEs.

The HSS_A 50 is connected to the MME_A 40 and the AAA_A 55 and is a managing node configured to manage subscriber information. The subscriber information of the HSS_A 50 is referred to during MME_A 40 access control, for example. Moreover, the HSS_A 50 may be connected to the location management device different from the MME_A 40.

The AAA_A 55 is connected to the PGW 30, the HSS_A 50, the PCRF_A 60, and the WLAN ANa 70, and is configured to perform access control for the UE_A 10 connected via the WLAN ANa 70.

The PCRF_A 60 is connected to the PGW_A 30, the WLAN ANa 75, the AAA_A 55, and the PDN_A 5 and is configured to perform QoS management on data delivery. For example, the PCRF_A 60 manages QoS of a communication path between the UE_A 10 and the PDN_A 5.

The ePDG_A 65 is connected to the PGW 30 and the WLAN ANb 75 and is configured to deliver user data by functioning as a gateway device between the core network_A 90 and the WLAN ANb 75.

The SGSN_A 42 is connected to the UTRAN_A 20, the GERAN_A 25, and the SGW_A 35 and is a control device for location management between a 3G/2G access network (UTRAN/GERAN) and the LTE access network (E-UTRAN). In addition, the SGSN_A 42 has functions of: selecting the PGW and the SGW; managing a time zone of the UE; and selecting the MME at the time of handover to the E-UTRAN.

Additionally, as illustrated in FIG. 2B, each radio access network includes apparatuses to which the UE_A 10 is actually connected (such as a base station apparatus and an access point apparatus), and the like. The apparatuses used in these connections can be thought of as apparatuses adapted to the radio access networks.

In the present embodiment, the LTE AN 80 includes the eNB_A 45. The eNB_A 45 is a radio base station to which the UE_A 10 connects in an LTE access system, and the LTE AN_A 80 may include one or multiple radio base stations.

The WLAN ANa 70 is configured to include a WLAN APa 72 and a TWAG_A 74. The WLAN APa 72 is a radio base station to which the UE_A 10 connects in the WLAN access system trusted by the operator running the core network_A 90, and the WLAN ANa 70 may include one or multiple radio base stations. The TWAG_A 74 serves as a gateway device between the core network_A 90 and the WLAN ANa 70. The WLAN APa 72 and the TWAG_A 74 may be configured as a single device.

Even in a case that the operator running the core network_A 90 and the operator running the WLAN ANa 70 are different, such a configuration can be implemented through contracts and agreements between the operators.

Furthermore, the WLAN ANb 75 is configured to include a WLAN APb 76. The WLAN APb 76 is a radio base station to which the UE_A 10 connects in the WLAN access system in a case that no trusting relationship is established with the operator running the core network_A 90, and the WLAN ANb 75 may include one or multiple radio base stations.

In this manner, the WLAN ANb 75 is connected to the core network_A 90 via the ePDG_A 65, which is a device included in the core network_A 90, serving as a gateway. The ePDG_A 65 has a security function for ensuring security.

The UTRAN_A 20 is configured to include a Radio Network Controller (RNC)_A 24 and an eNB (UTRAN)_A 22. The eNB (UTRAN)_A 22 is a radio base station to which the UE_A 10 connects through a UMTS Terrestrial Radio Access (UTRA), and the UTRAN_A 20 may include one or multiple radio base stations. Furthermore, the RNC_A 24 is a control unit configured to connect the core network_A 90 and the eNB (UTRAN)_A 22, and the UTRAN_A 20 may include one or multiple RNCs. Moreover, the RNC_A 24 may be connected to one or multiple eNBs (UTRANs)_A 22. In addition, the RNC_A 24 may be connected to a radio base station (Base Station Subsystem (BSS)_A 26) included in the GERAN_A 25.

The GERAN_A 25 is configured to include a BSS_A 26. The BSS_A 26 is a radio base station to which the UE_A 10 connects through GSM (trade name)/EDGE Radio Access (GERA), and the GERAN_A 25 may be constituted of one or multiple radio base station BSSs. Furthermore, the multiple BSSs may be connected to each other. Moreover, the BSS_A 26 may be connected to the RNC_A 24.

Figure 3A:
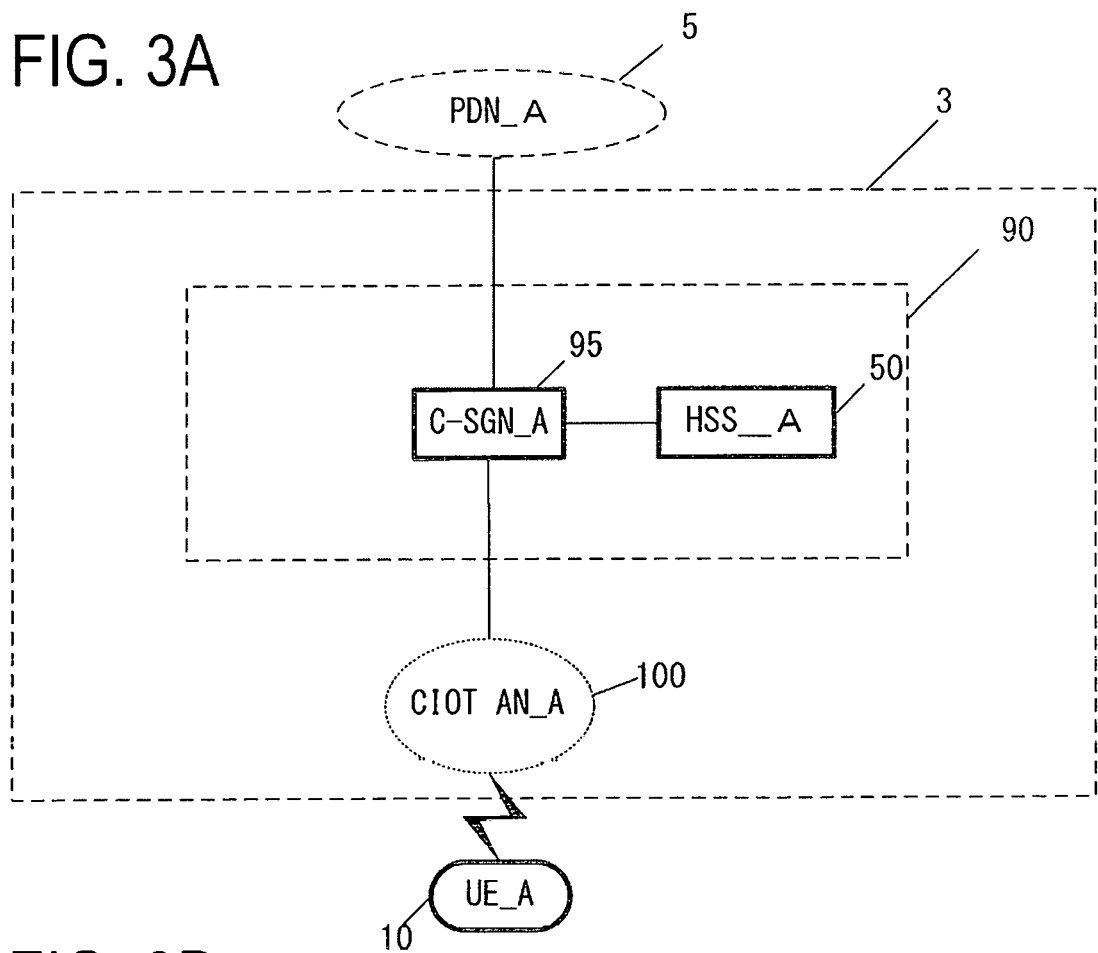

Next, a second example of a configuration of the core network_A 90 will be described. For example, in a case that the UE_A 10 is a CIoT device, the core network_A 90 may be configured as illustrated in FIG. 3A. The core network_A 90 in FIG. 3A includes a CIoT Serving Gateway Node (C-SGN)_A 95 and the HSS_A 50. Note that in the same manner as FIGS. 2A and 2B, in order for the core network_A 90 to provide connectivity to an access network other than LTE, the core network_A 90 may include the AAA_A 55 and/or the PCRF_A 60 and/or the ePDG_A 65 and/or SGSN_A 42.

The C-SGN_A 95 may be a node that incorporates some or all of the functions of the MME_A 40, the SGW_A 35, and the PGW_A 30 in FIGS. 2A and 2B. The C-SGN_A 95 may be a node for managing establishment and disconnection of connectivity of the CIoT terminal, mobility of the CIoT terminal, and the like.

In other words, the C-SGN_A 95 may have a gateway device function between the PDN_A and the core network_A 90, a gateway device function between the core network_A 90 and a CIOT AN_A 100, and a location management function of the UE_A 10.

As illustrated in the drawings, the UE_A 10 connects to the core network_A 90 through the radio access network CIOT AN_A 100.

Figure 3B:
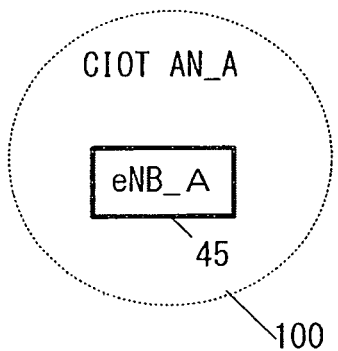

FIG. 3B illustrates the configuration of the CIOT AN_A 100. As illustrated in the drawing, the CIOT AN_A 100 may be configured including the eNB_A 45. The eNB_A 45 included in the CIOT AN_A 100 may be the same base station as the eNB_A 45 included in the LTE AN_A 80. Alternatively, the eNB_A 45 included in the CIOT AN_A 100 may be a base station accommodating the CIoT terminal, which is different from the eNB_A 45 included in the LTE AN_A 80.

Note that a first core network and/or a second core network may be constituted of a system that is optimized for the IoT.

Note that herein, the UE_A 10 being connected to radio access networks refers to the UE_A 10 being connected to a base station apparatus, an access point, or the like included in each of the radio access networks, and data, signals, and the like being transmitted and/or received also pass through those base station apparatuses, access points, or the like.

1.2. Device Configuration

The configuration of each apparatus will be described below.

1.2.1. eNB Configuration

Figure 4:
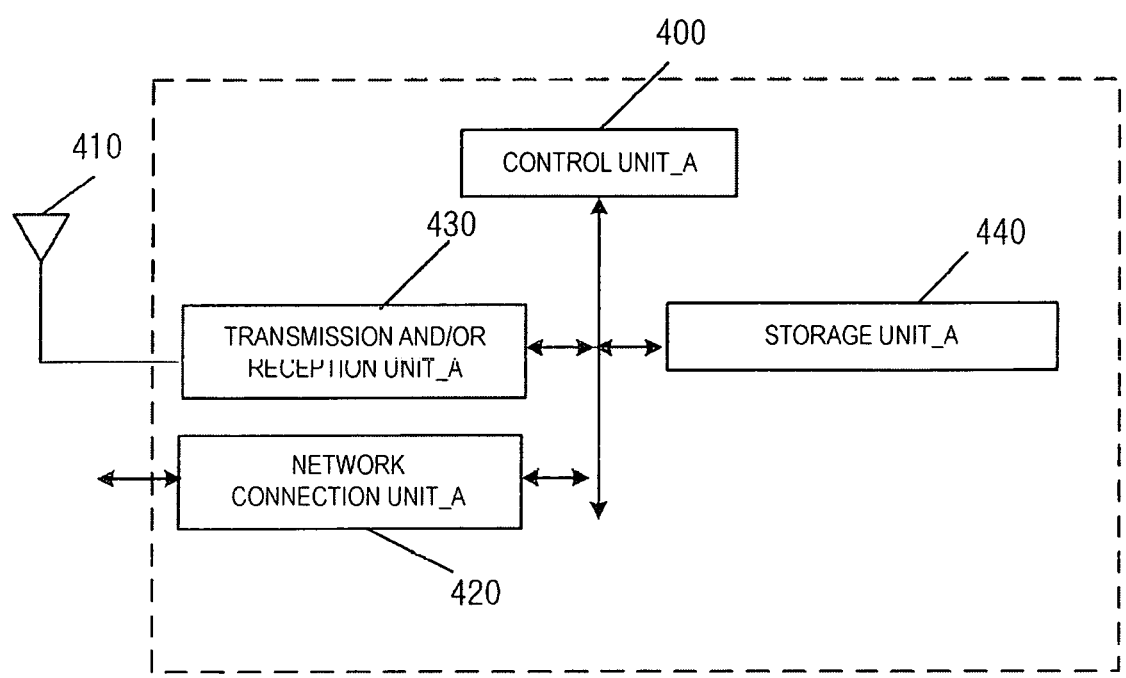
FIG. 4 is a diagram illustrating a device configuration of an eNB.

The configuration of the eNB_A 45 will be described below. FIG. 4 illustrates the device configuration of the eNB_A 45. As illustrated in FIG. 4, the eNB_A 45 includes a network connection unit_A 420, a transmission and/or reception unit_A 430, a control unit_A 400, and a storage unit_A 440. The network connection unit_A 420, the transmission and/or reception unit_A 430, and the storage unit_A 440 are connected to the control unit_A 400 via a bus.

The control unit_A 400 is a function unit for controlling the eNB_A 45. The control unit_A 400 implements various processes by reading out various programs stored in the storage unit_A 440 and performing the programs.

The network connection unit_A 420 is a function unit through which the eNB_A 45 connects to the MME_A 40 and/or the SGW_A 35. Further, the network connection unit_A 420 is a transmission and/or reception function unit with which the eNB_A 45 transmits and/or receives user data and/or control data to/from the MME_A 40 and/or the SGW_A 35.

The transmission and/or reception unit_A 430 is a function unit through which the eNB_A 45 connects to the UE_A 10. Further, the transmission and/or reception unit_A 430 is a transmission and/or reception function unit with which the user data and/or the control data is/are transmitted and/or received to/from the UE_A 10. Furthermore, an external antenna_A 410 is connected to the transmission and/or reception unit_A 430.

The storage unit_A 440 is a function unit for storing programs, data, and the like necessary for each operation of the eNB_A 45. A storage unit 640 is constituted of, for example, a semiconductor memory, a Hard Disk Drive (HDD), or the like.

The storage unit_A 440 may store at least identification information and/or control information and/or a flag and/or a parameter included in a control message transmitted and/or received in the communication procedure, which will be described later.

1.2.2. MME Configuration

The configuration of the MME_A 40 will be described below. FIG. 6(a) illustrates the device configuration of the MME_A 40. As illustrated in FIG. 6(a), the MME_A 40 includes a network connection unit_B 620, a control unit_B 600, and a storage unit_B 640. The network connection unit_B 620 and the storage unit_B 640 are connected to the control unit_B 600 via a bus.

The control unit_B 600 is a function unit for controlling the MME_A 40. The control unit_B 600 implements various processes by reading out and performing various programs stored in the storage unit_B 640.

The network connection unit_B 620 is a function unit through which the MME_A 40 connects to the eNB_A 45 and/or the HSS_A 50 and/or the SGW_A 35. In addition, the network connection unit_B 620 is a transmission and/or reception function unit with which the MME_A 40 transmits and/or receives user data and/or control data to/from the eNB_A 45 and/or the HSS_A 50 and/or the SGW_A 35.

The storage unit_B 640 is a function unit for storing programs, data, and the like necessary for each operation of the MME_A 40. The storage unit_B 640 is constituted of, for example, a semiconductor memory, a Hard Disk Drive (HDD), or the like.

The storage unit_B 640 may store at least identification information and/or control information and/or a flag and/or a parameter included in the control message transmitted and/or received in the communication procedure, which will be described later.

As illustrated in FIG. 6(a), the storage unit_B 640 stores an MME context 642, a security context 648, and MME emergency configuration data 650. Note that the MME context includes an MM context 644 and an EPS bearer context 646. Alternatively, the MME context may include an EMM context and an ESM context. The MM context 644 may be the EMM context, the EPS bearer context 646 may be the ESM context.

FIG. 7(b), FIG. 8(b), and FIG. 9(b) illustrate information elements of the MME context stored for each UE. As illustrated in the drawings, the MME context stored for each UE includes an IMSI, an IMSI-unauthenticated-indicator, an MSISDN, an MM State, a GUTI, an ME Identity, a Tracking Area List, a TAI of last TAU, an E-UTRAN Cell Global Identity (ECGI), an E-UTRAN Cell Identity Age, a CSG ID, a CSG membership, an Access mode, an Authentication Vector, a UE Radio Access Capability, MS Classmark 2, MS Classmark 3, Supported Codecs, a UE Network Capability, an MS Network Capability, UE Specific DRX Parameters, a Selected NAS Algorithm, an eKSI, a K_ASME, NAS Keys and COUNT, a Selected CN operator ID, a Recovery, an Access Restriction, an ODB for PS parameters, an APN-OI Replacement, an MME IP address for S11, an MME TEID for S11, an S-GW IP address for S11/S4, an S GW TEID for S11/S4, an SGSN IP address for S3, an SGSN TEID for S3, an eNodeB Address in Use for S1-MME, an eNB UE S1AP ID, an MME UE S1AP ID, a Subscribed UE-AMBR, a UE-AMBR, EPS Subscribed Charging Characteristics, a Subscribed RFSP Index, an RFSP Index in Use, a Trace reference, a Trace type, a Trigger ID, an OMC identity, a URRP-MME, CSG Subscription Data, a LIPA Allowed, a Subscribed Periodic RAU/TAU Timer, an MPS CS priority, an MPS EPS priority, a Voice Support Match Indicator, and a Homogenous Support of IMS Voice over PS Sessions.

The MME context for each UE may include a Mobility Type.

The IMSI is permanent identification information of a user. The IMSI is identical to the IMSI stored in the HSS_A 50.

The IMSI-unauthenticated-indicator is instruction information indicating that this IMSI is not authenticated.

MSISDN represents the phone number of UE. The MSISDN is indicated by the storage unit of the HSS_A 50.

The MM State indicates a mobility management state of the MME. This management information indicates an ECM-IDLE state in which a connection between the eNB and the core network is released, an ECM-CONNECTED state in which the connection between the eNB and the core network is not released, or an EMM-DEREGISTERED state in which the MME does not store the location information of the UE.

The Globally Unique Temporary Identity (GUTI) is temporary identification information about the UE. The GUTI includes the identification information about the MME (Globally Unique MME Identifier (GUMMEI)) and the identification information about the UE in a specific MME (M-TMSI).

The ME Identity is an ID of the UE, and may be the IMEI/IMISV, for example.

The Tracking Area List is a list of the tracking area identification information which is assigned to the UE.

The TAI of last TAU is the tracking area identification information indicated by a recent tracking area update procedure.

The ECGI is cell identification information of the recent UE known by the MME_A 40.

The E-UTRAN Cell Identity Age indicates the elapsed time since the MME acquires the ECGI.

The CSG ID is identification information of a Closed Subscriber Group (CSG), in which the UE recently operates, known by the MME.

The CSG membership is member information of the CSG of the recent UE known by the MME. The CSG membership indicates whether the UE is the CSG member.

The Access mode is an access mode of a cell identified by the ECGI, may be identification information indicating that the ECGI is a hybrid which allows access to both the UEs which is the CSG and is not the CSG.

The Authentication Vector indicates a temporary Authentication and Key Agreement (AKA) of a specific UE followed by the MME. The Authentication Vector includes a random value RAND used for authentication, an expectation response XRES, a key K_ASME, and a language (token) AUTN authenticated by the network.

The UE Radio Access Capability is identification information indicating a radio access capability of the UE.

MS Classmark 2 is a classification symbol (Classmark) of a core network of a CS domain of 3G/2G (UTRAN/GERAN). MS Classmark 2 is used in a case that the UE supports a Single Radio Voice Call Continuity (SRVCC) for the GERAN or the UTRAN.

MS Classmark 3 is a classification symbol (Classmark) of a radio network of the CS domain of the GERAN. MS Classmark 3 is used in a case that the UE supports the Single Radio Voice Call Continuity (SRVCC) for the GERAN.

The Supported Codecs is a code list supported by the CS domain. This list is used in the case that the UE supports SRVCC for the GERAN or the UTRAN.

The UE Network Capability includes an algorithm of security supported by the UE and a key derivative function.

The MS Network Capability is information including at least one kind of information necessary for the SGSN to the UE having the GERAN and/or UTRAN function.

The UE Specific DRX Parameters are parameters used for determining a Discontinuous Reception (DRX) cycle length of the UE. Here, DRX is a function for changing the UE to a low-power-consumption mode in a case that there is no communication in a certain period of time, in order to reduce power consumption of a battery of the UE as much as possible.

The Selected NAS Algorithm is a selected security algorithm of a Non-Access Stream (NAS).

The eKSI is a key set indicating the K_ASME. The eKSI may indicate whether to use a security key acquired by a security authentication of the UTRAN or the E-UTRAN.

The K_ASME is a key for E-UTRAN key hierarchy generated based on a Cipher Key (CK) and an Integrity Key (IK).

The NAS Keys and COUNT includes a key K_NASint, a key K_NASenc, and a NAS COUNT parameter. The key K_NASint is a key for encryption between the UE and the MME, the key K_NASenc is a key for security protection between the UE and the MME. Additionally, the NAS COUNT is a count which starts a count in a case that a new key by which security between the UE and the MME is established is configured.

The Selected CN operator ID is identification information, which is used for sharing the network among operators, of a selected core network operator.

The Recovery is identification information indicating whether the HSS performs database recovery.

The Access Restriction is registration information for access restriction.

The ODB for PS parameters indicates a state of an operator determined barring (ODB). Here, ODB is an access rule determined by the network operator (operator).

The APN-OI Replacement is a domain name substituting for APN when PGW FQDN is constructed in order to perform a DNS resolution. This substitute domain name is applied to all APNs.

The MME IP address for S11 is an IP address of the MME used for an interface with the SGW.

The MME TEID for S11 is a Tunnel Endpoint Identifier (TEID) used for the interface with the SGW.

The S-GW IP address for S11/S4 is an IP address of the SGW used for an interface between the MME and the SGW or between the SGSN and the MME.

The S GW TEID for S11/S4 is a TEID of the SGW used for the interface between the MME and the SGW or between the SGSN and the MME.

The SGSN IP address for S3 is an IP address of the SGSN used for the interface between the MME and the SGSN.

The SGSN TEID for S3 is a TEID of the SGSN used for the interface between the MME and the SGSN.

The eNodeB Address in Use for S1-MME is an IP address of the eNB recently used for an interface between the MME and the eNB.

The eNB UE S1AP ID is identification information of the UE in the eNB.

The MME UE S1AP ID is identification information of the UE in the MME.

The Subscribed UE-AMBR indicates the maximum value of a Maximum Bit Rate (MBR) of uplink communication and downlink communication for sharing all Non-Guaranteed Bit Rate (GBR) bearers (non-guaranteed bearers) in accordance with user registration information.

The UE-AMBR indicates the maximum value of the MBR of the uplink communication and the downlink communication which are recently used for sharing all the Non-GBR bearers (non-guaranteed bearers).

The EPS Subscribed Charging Characteristics indicate a charging performance of the UE. For example, the EPS Subscribed Charging Characteristics may indicate registration information such as normal, prepaid, a flat rate, hot billing, or the like.

The Subscribed RFSP Index is an index for a specific RRM configuration in the E-UTRAN acquired from the HSS.

The RFSP Index in Use is an index for the specific RRM configuration in the E-UTRAN which is recently used.

The Trace reference is identification information for identifying a specific trace record or a record set.

The Trace type indicates a type of the trace. For example, the Trace type may indicate a type traced by the HSS and/or a type traced by the MME, the SGW, or the PGW.

The Trigger ID is identification information for identifying a constituent element for which the trace starts.

The OMC Identity is identification information for identifying the OMC which receives the record of the trace.

The URRP-MME is identification information indicating that the HSS requests UE activity notification from the MME.

The CSG Subscription Data are a relevant list of a PLMN (VPLMN) CSG ID of a roaming destination and an equivalent PLMN of the roaming destination. The CSG Subscription Data may be associated with an expiration date indicating an expiration date of the CSG ID and an absent expiration date indicating that there is no expiration date for each CSG ID. The CSG ID may be used for a specific PDN connection through LIPA.

The LIPA Allowed indicates whether the UE is allowed to use the LIPA in this PLMN, and the Subscribed Periodic RAU/TAU Timer is a timer of a periodic RAU and/or TAU.

The MPS CS priority indicates that the UE is registered in eMLPP or a 1× RTT priority service in the CS domain.

The MPS EPS priority is identification information indicating that the UE is registered in MPS in the EPS domain.

The Voice Support Match Indicator indicates whether a radio capability of the UE is compatible with the network configuration. For example, the Voice Support Match Indicator indicates whether the SRVCC support by the UE matches the support for voice call by the network.

The Homogenous Support of IMS Voice over PS Sessions for MME is instruction information indicating, for each UE, whether an IMS voice call on a PS session is supported. The Homogenous Support of IMS Voice over PS Sessions for MME includes "Supported" in which an IP Multimedia Subsystem (IMS) voice call on a Packet Switched (PS: line switching) session in all the Tracking Areas (TAs) managed by the MME is supported, and "Not Supported" indicating a case where there is no TA in which the IMS voice call on the PS session is supported. Additionally, the MME does not notify the HSS of this instruction information, in a case that the IMS voice call on the PS session is not uniformly supported (the TA in which the support is performed and the TA in which the support is not performed are both present in the MME), and in a case that it is not clear whether to be supported.

FIG. 10(c) illustrates information elements included in the MME context for each PDN connection stored for each PDN connection. As illustrated in the drawing, the MME context for each PDN connection includes an APN in Use, an APN Restriction, an APN Subscribed, a PDN Type, an IP Address, EPS PDN Charging Characteristics, an APN-OI Replacement, SIPTO permissions, a Local Home Network ID, LIPA permissions, a WLAN offloadability, a VPLMN Address Allowed, a PDN GW Address in Use (control information), a PDN GW TEID for S5/S8 (control information), an MS Info Change Reporting Action, a CSG Information Reporting Action, a Presence Reporting Area Action, an EPS subscribed QoS profile, a Subscribed APN-AMBR, an APN-AMBR, a PDN GW GRE Key for uplink traffic (user data), a Default bearer, and a low access priority.

The MME context for each PDN connection may include a Mobility Type.

The APN in Use indicates APN which is recently used. This APN includes identification information about the APN network and identification information about a default operator.

The APN Restriction indicates a restriction on a combination of an APN type to APN associated with this bearer context. In other words, the APN Restriction is information for restricting the number and types of APNs which can be established.

The APN Subscribed refers to a registration APN received from the HSS.

The PDN Type indicates the type of the IP address. The PDN Type indicates IPv4, IPv6, or IPv4v6, for example.

The IP Address indicates an IPv4 address or an IPv6 Prefix. Note that the IP address may store both the IPv4 and IPv6 prefixes.

The EPS PDN Charging Characteristics indicate a charging performance. The EPS PDN Charging Characteristics may indicate, for example, normal, prepaid, a flat rate, or hot billing.

The APN-OI Replacement is a proxy domain name of APN having the same role as that of the APN-OI Replacement, registered for each UE. Note that the APN-OI Replacement has a higher priority than that of the APN-OI Replacement for each UE.

The SIPTO permissions indicate permission information to a Selected IP Traffic Offload (SIPTO) of traffic using this APN. Specifically, the SIPTO permissions identify a prohibition of the use of SIPTO, permission of the use of SIPTO in the network excluding the local network, permission of the use of SIPTO in the network including the local network, or permission of the use of SIPTO only in the local network.

The Local Home Network ID indicates identification information of a home network to which the base station belongs, in a case that SIPTO (SIPTO@LN) using the local network can be used.

The LIPA permissions are identification information indicating whether this PDN can access through LIPA. Specifically, the LIPA permissions may be an LIPA-prohibited which does not permit LIPA, an LIPA-only which permits only LIPA, or an LIPA-conditional which permits LIPA depending on a condition.

The WLAN offload ability is identification information indicating whether traffic connected through this APN can perform offload to the wireless LAN by utilizing a cooperative function between the wireless LAN and 3GPP, or maintains the 3GPP connection. The WLAN offload ability may vary for each RAT type. Specifically, different WLAN offload abilities may be present for LTE (E-UTRA) and 3G (UTRA).

The VPLMN Address Allowed indicates whether a connection in which the UE uses this APN is allowed to use only an HPLMN domain (IP address) PGW in PLMN (VPLMN) of the roaming destination or allowed to use additionally the PGW in the VPLMN domain.

The PDN GW Address in Use (control information) indicates a recent IP address of the PGW. This address is used when a control signal is transmitted.

The PDN GW TEID for S5/S8 (control information) is a TEID used for transmission and/or reception of the control information in an interface (S5/S8) between the SGW and the PGW.

The MS Info Change Reporting Action is an information element indicating that it is necessary to notify the PGW of user location information being changed.

The CSG Information Reporting Action is an information element indicating that it is necessary to notify the PGW of CSG information being changed.

The Presence Reporting Area Action indicates necessity of notification of the change as to whether the UE is present in a Presence Reporting Area. This information element separates into identification information of the presence reporting area and an element included in the presence reporting area.

The EPS subscribed QoS profile indicates a QoS parameter to a default bearer at a bearer level.

The Subscribed APN-AMBR indicates the maximum value of the Maximum Bit Rate (MBR) of the uplink communication and the downlink communication for sharing all the Non-GBR bearers (non-guaranteed bearers) established for this APN in accordance with the user registration information.

The APN-AMBR indicates the maximum value of the Maximum Bit Rate (MBR) of the uplink communication and the downlink communication for sharing all the Non-GBR bearers (non-guaranteed bearers) established for this APN, which has been determined by the PGW.

The PDN GW GRE Key for uplink traffic (user data) is a Generic Routing Encapsulation (GRE) key for the uplink communication of the user data of the interface between the SGW and the PGW.

The Default Bearer is information that is acquired and/or generated when the PDN connection is established, and is EPS bearer identification information for identifying a default bearer associated with the PDN connection.

Note that the EPS bearer in the present embodiment may be a communication path that is established between the UE_A 10 and the C-SGN_A 95. In addition, the EPS bearer may include a Radio Bearer (RB) established between the UE_A 10 and the eNB_A 45 and an S1 bearer established between the eNB_A 45 and the C-SGN_A 95. Here, the RB and the EPS bearer may be associated with each other on a one-to-one basis. Accordingly, identification information of the RB may be associated with identification information of the EPS bearer on a one-to-one basis, or may be the same as the identification information of the EPS bearer.

The EPS bearer may be a logical communication path that is established between the UE_A 10 and the PGW_A 30. In this case as well, the EPS bearer may include a Radio Bearer (RB) established between the UE_A 10 and the eNB_A 45. In addition, the RB and the EPS bearer may be associated with each other on a one-to-one basis. Accordingly, identification information of the RB may be associated with identification information of the EPS bearer on a one-to-one basis, or may be the same as the identification information of the EPS bearer.

Therefore, the Default Bearer may be identification information for identifying a Signalling Radio Bearer (SRB) and/or a Control Signalling Radio Bearer (CRB), or may be identification information for identifying a Data Radio Bearer (DRB).

Here, the SRB in the present embodiment may be RB that is originally established for transmission and/or reception of control information such as a control message. Here, the CRB in the present embodiment may be RB that is originally established for transmission and/or reception of control information such as a control message. Note that in the present embodiment, RB that originally serves to transmit and/or receive a control message is used to transmit and/or receive user data. Therefore, in the present embodiment, the SRB or the CRB is used to transmit and/or receive a control message and user data.

Moreover, the DRB according to the present embodiment may be RB that is established for transmission and/or reception of user data.

The low access priority indicates that the UE requests a low access priority, when the PDN connection is opened.

FIG. 11(d) illustrates the MME context stored for each bearer. As illustrated in FIG. 11(d), the MME context stored for each bearer includes an EPS Bearer ID, a TI, an S-GW IP address for S1-u, an S-GW TEID for S1-u, a PDN GW TEID for S5/S8, a PDN GW IP address for S5/S8, an EPS bearer QoS, and a TFT.

The MME context for each bearer may include a Mobility Type.

The EPS Bearer ID is the only identification information for identifying the EPS bearer for a UE connection via the E-UTRAN.

Note that the EPS Bearer ID may be EPS bearer identification information for identifying a dedicated bearer. Therefore, the EPS bearer ID may be identification information for identifying an EPS bearer that is different from the default bearer.

Note that, as has already been described, the EPS bearer may be a communication path that is established between the UE_A 10 and the C-SGN_A 95. In addition, the EPS bearer may include a Radio Bearer (RB) established between the UE_A 10 and the eNB_A 45 and an S1 bearer established between the eNB_A 45 and the C-SGN_A 95. Here, the RB and the EPS bearer may be associated with each other on a one-to-one basis. Accordingly, identification information of the RB may be associated with identification information of the EPS bearer on a one-to-one basis, or may be the same as the identification information of the EPS bearer.

The EPS bearer may be a logical communication path that is established between the UE_A 10 and the PGW_A 30. In this case as well, the EPS bearer may include a Radio Bearer (RB) established between the UE_A 10 and the eNB_A 45. In addition, the RB and the EPS bearer may be associated with each other on a one-to-one basis. Accordingly, identification information of the RB may be associated with identification information of the EPS bearer on a one-to-one basis, or may be the same as the identification information of the EPS bearer.

Therefore, an EPS bearer ID for identifying the dedicated bearer may be identification information for identifying a Signalling Radio Bearer (SRB) and/or a Control Signalling Radio Bearer (CRB), or may be identification information for identifying a Data Radio Bearer (DRB).

Here, as has already been described, the SRB in the present embodiment may be RB that is originally established for transmission and/or reception of control information such as a control message. Here, the CRB in the present embodiment may be RB that is originally established for transmission and/or reception of control information such as a control message. Note that in the present embodiment, RB that originally serves to transmit and/or receive a control message is used to transmit and/or receive user data. Therefore, in the present embodiment, the SRB or the CRB is used to transmit and/or receive a control message and user data.

Moreover, the DRB in the present embodiment may be RB that is established for transmission and/or reception of user data.

The TI is an abbreviation of a "Transaction Identifier", and is identification information identifying a bidirectional message flow (Transaction).

The S-GW IP address for S1-u is an IP address of the SGW used for an interface between the eNB and the SGW.

In a case that the user data is transmitted and/or received while being included in a message for control information, the S-GW IP address for S1-u may be an IP address of the SGW used for an interface between the MME and/or the SGSN and the SGW, or may be the S-GW IP address for S11/S4.

The S-GW TEID for S1u is a TEID of the SGW used for the interface between the eNB and the SGW.

In a case that the MME and/or the user data is/are transmitted and/or received while being included in a message for control information, the S-GW TEID for S1u may be a TEID address of the SGW used for an interface between the SGSN and the SGW, or may be S-GW TEID for S11/S4.

The PDN GW TEID for S5/S8 is a TEID of the PGW for user data transmission in the interface between the SGW and the PGW.

The PDN GW IP address for S5/S8 is an IP address of the PGW for user data transmission in the interface between the SGW and the PGW.

The EPS bearer QoS includes a QoS Class Identifier (QC1) and an Allocation and Retention Priority (ARP). QC1 indicates a class to which the QoS belongs. QoS can be classified in accordance with presence or absence of band control, an allowable delay time, a packet loss rate, or the like. The QC1 includes information indicating the priority. ARP is information representing a priority relating to maintaining the bearer.

The TFT is an abbreviation of a "Traffic Flow Template", and indicates all packet filters associated with the EPS bearer.

Here, the information elements included in the MME context illustrated in FIG. 7(*b*) to FIG. 11(*d*) are included in either the MM context 644 or the EPS bearer context 646. For example, the MME context for each bearer illustrated in FIG. 11(*d*) may be stored in the EPS bearer context, and the other information elements may be stored in the MM context. Alternatively, the MME context for each PDN connection illustrated in FIG. 10(*c*) and the MME context for each bearer illustrated in FIG. 11(*d*) may be stored in the EPS bearer context, and the other information elements may be stored in the MM context.

Figure 6:
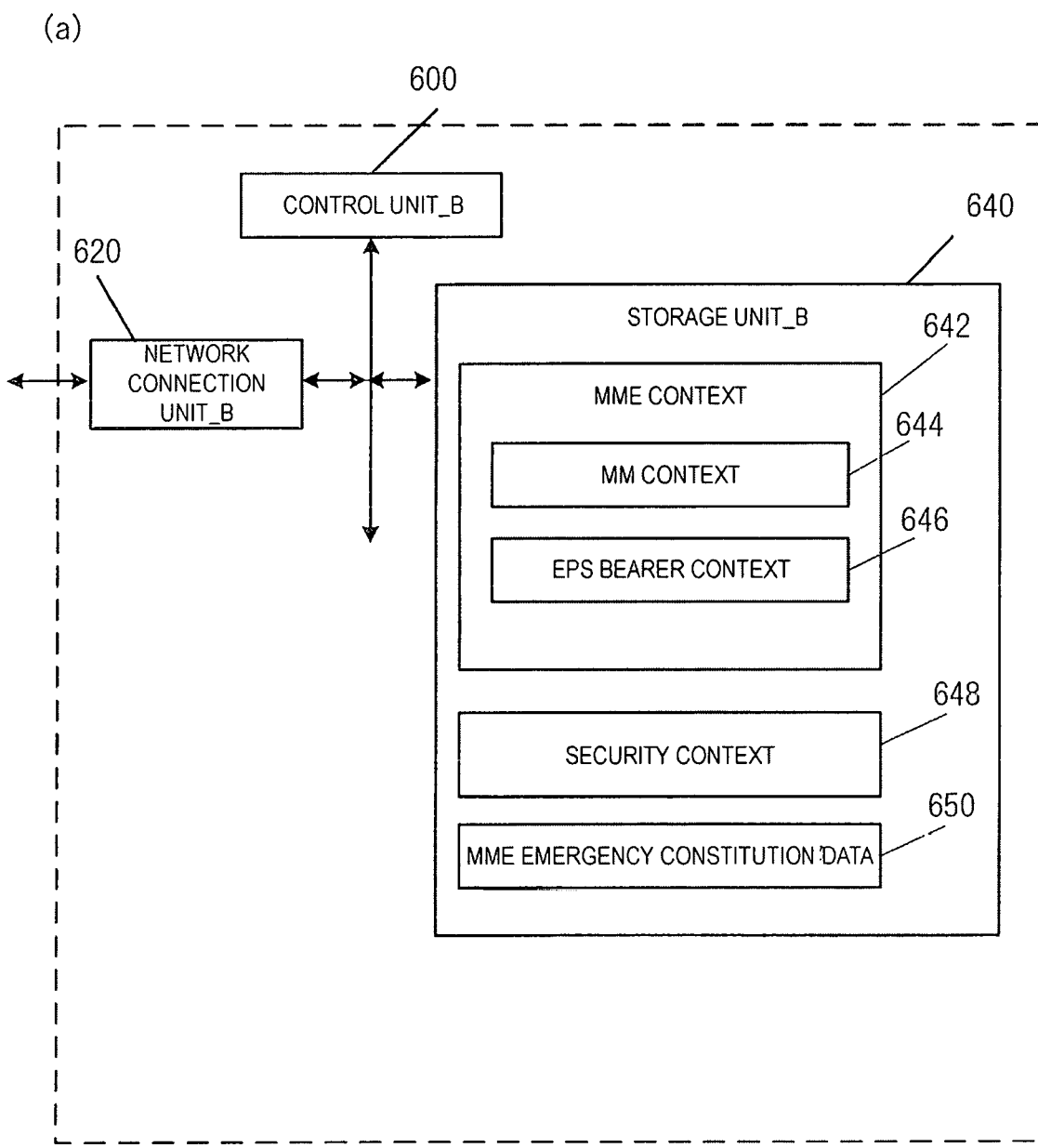
FIG. 6 is a diagram illustrating a device configuration of an MME.

As illustrated in FIG. 6(*a*), the storage unit_B 640 of the MME may store the security context 648. FIG. 12(*e*) illustrates information elements included in the security context 648.

As illustrated in FIG. 12(*e*), the security context includes an EPS AS security context and an EPS NAS security context. The EPS AS security context is a context relating to security of an Access Stratum (AS), and the EPS NAS security context is a context relating to security of a Non-Access Stratum (NAS).

FIG. 12(*f*) illustrates information elements included in the EPS AS security context. As illustrated in FIG. 12(*f*), the EPS AS security context includes a cryptographic key, a Next Hop parameter (NH), a Next Hop Chaining Counter parameter (NCC), and identifiers of the selected AS level cryptographic algorithms.

The cryptographic key is an encryption key in an access stratum.

The NH is an information element determined from the K_ASME. The NH is an information element for enabling a forward security.

The NCC is an information element associated with the NH. The NCC represents the number of occurrences of handovers in a vertical direction changing the network.

The identifiers of the selected AS level cryptographic algorithms are identification information of a selected encryption algorithm.

FIG. 12(*g*) illustrates information elements included in the EPS NAS security context. As illustrated in FIG. 12(*g*), the EPS NAS security context may include the K_ASME, UE Security capabilities, and the NAS COUNT.

The K_ASME is a key for E-UTRAN key hierarchy generated based on the keys CK and IK.

The UE Security capabilities is a set of identification information corresponding to a cipher and an algorithm used by the UE. This information includes information for the access stratum and information for the non-access stratum. Furthermore, in a case that the UE supports access to the UTRAN/GERAN, this information includes information for the UTRAN/GERAN.

The NAS COUN is a counter indicating the time during which the K_ASME is operating.

The security context 648 may be included in the MME context 642. As illustrated in FIG. 6(*a*), the security context 648 and the MME context 642 may be separately present.

FIG. 12(*h*) illustrates information elements stored in the MME emergency configuration data 650. The MME emergency configuration data are information which is used instead of registration information of the UE acquired from the HSS. As illustrated in FIG. 12(*h*), the MME emergency configuration data 650 include an Emergency Access Point Name (em APN), an Emergency QoS profile, an Emergency APN-AMBR, an Emergency PDN GW identity, and a Non-3GPP HO Emergency PDN GW identity.

The em APN indicates an access point name used for the PDN connection for emergency.

The Emergency QoS profile indicates QoS of the default bearer of em APN at a bearer level.

The Emergency APN-AMBR indicates the maximum value of the MBR of the uplink communication and the downlink communication for sharing the Non-GBR bearers (non-guaranteed bearers) established for em APN. This value is determined by the PGW.

The Emergency PDN GW identity is identification information of the PGW statically configured to em APN. This identification information may be an FQDN or an IP address.

The Non-3GPP HO Emergency PDN GW identity is identification information of the PGW statically configured to em APN, in a case that the PLMN supports a handover to an access network other than 3GPP. This identification information may be an FQDN or an IP address.

Furthermore, the MME_A 40 may manage a connection state with respect to the UE while synchronizing with the UE.

1.2.3. SGW Configuration

Figure 13:
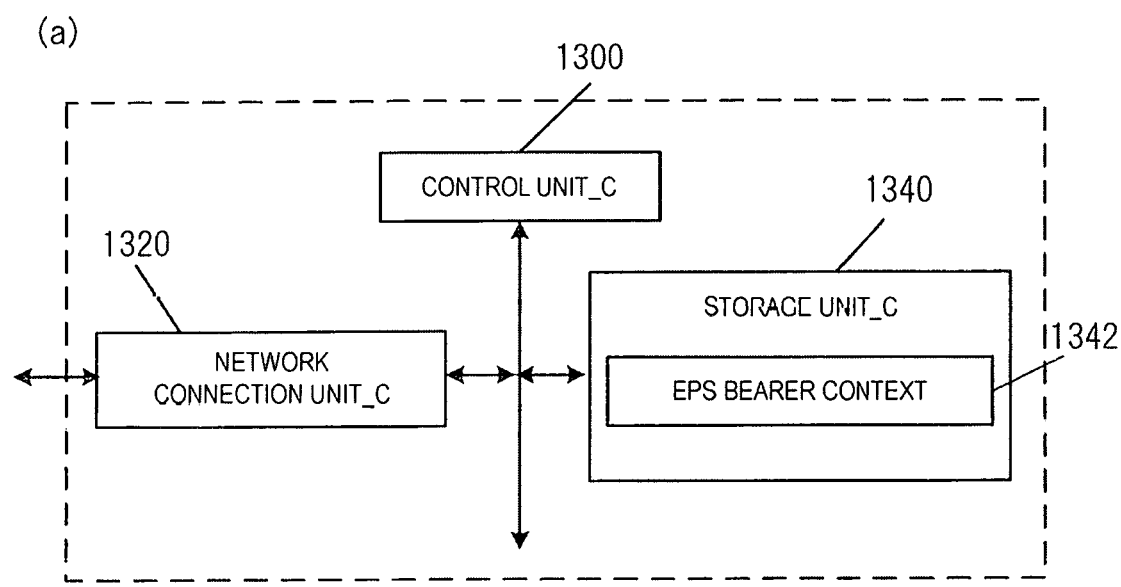
FIG. 13 is a diagram illustrating a device configuration of a SGW.

Hereinafter, the configuration of the SGW_A 35 will be described. FIG. 13(*a*) illustrates the device configuration of the SGW_A 35. As illustrated in FIG. 13(*a*), the SGW_A 35 includes a network connection unit_C 1320, a control unit_C 1300, and a storage unit_C 1340. The network connection unit_C 1320 and the storage unit_C 1340 are connected to the control unit_C 1300 via a bus.

The control unit_C 1300 is a function unit for controlling the SGW_A 35. The control unit_C 1300 implements various processes by reading out and performing various programs stored in the storage unit_C 1340.

The network connection unit_C 1320 is a function unit through which the SGW_A 35 connects to the eNB_A 45 and/or the MME_A 40 and/or the PGW_A 30 and/or SGSN_A 42. In addition, the network connection unit_C 1320 is a transmission and/or reception function unit with which the SGW_A 35 transmits and/or receives user data and/or control data to/from the eNB_A 45 and/or the MME_A 40 and/or the PGW_A 30 and/or SGSN_A 42.

The storage unit_C 1340 is a function unit for storing programs, data, and the like necessary for each operation of the SGW_A 35. The storage unit_C 1340 is constituted of, for example, a semiconductor memory, a Hard Disk Drive (HDD), or the like.

The storage unit_C 1340 may store at least the identification information and/or the control information and/or the flag and/or the parameter included in the control message transmitted and/or received in the communication procedure, which will be described later.

As illustrated in drawing, the storage unit_C 1340 stores an EPS bearer context 1342. Note that the EPS bearer context includes an EPS bearer context stored for each UE, an EPS bearer context stored for each PDN, and an EPS bearer context stored for each bearer.

FIG. 14(*b*) illustrates information elements of the EPS bearer context stored for each UE. As illustrated in FIG. 14(*b*), the EPS bearer context stored for each UE includes an IMSI, an MSI-unauthenticated-indicator, an ME Identity, an MSISDN, a Selected CN operator id, an MME TEID for S11, an MME IP address for S11, an S-GW TEID for S11/S4, an S-GW IP address for S11/S4, an SGSN IP address for S4, an SGSN TEID for S4, a Trace reference, a Trace type, a Trigger ID, an OMC identity, a Last known Cell Id, and a Last known Cell Id age.

Additionally, the EPS bearer context for each UE may include a Mobility Type.

The IMSI is permanent identification information of a user. The IMSI is identical to the IMSI in the HSS_A 50.

The IMSI-unauthenticated-indicator is instruction information indicating that this IMSI is not authenticated.

The ME Identity is identification information of the UE, and may be the IMEI/IMISV, for example.

The MSISDN represents a basic phone number of the UE. The MSISDN is indicated by the storage unit of the HSS_A 50.

The Selected CN operator id is identification information, which is used for sharing the network among operators, of a selected core network operator.

The MME TEID for S11 is a TEID of the MME used for the interface between the MME and the SGW.

The MME IP address for S11 is an IP address of the MME used for the interface between the MME and the SGW.

The S-GW TEID for S11/S4 is a TEID of the SGW used for the interface between the MME and the SGW, or the interface between the SGSN and the SGW.

The S-GW IP address for S11/S4 is an IP address of the SGW used for the interface between the MME and the SGW, or the interface between the SGSN and the SGW.

The SGSN IP address for S4 is an IP address of the SGSN used for the interface between the SGSN and the SGW.

The SGSN TEID for S4 is a TEID of the SGSN used for the interface between the SGSN and the SGW.

The Trace reference is identification information for identifying a specific trace record or a record set.

The Trace Type indicates a type of the trace. For example, the Trace type may indicate a type traced by the HSS and/or a type traced by the MME, the SGW, or the PGW.

The Trigger ID is identification information for identifying a constituent element for which the trace starts.

The OMC Identity is identification information for identifying the OMC which receives the record of the trace.

The Last known Cell ID is recent location information of the UE notified by the network.

The Last known Cell ID age is information indicating the period from the time when the Last known Cell ID is stored to the present.

Furthermore, the EPS bearer context includes an EPS bearer context for each PDN connection stored for each PDN connection. FIG. 15(*c*) illustrates the EPS bearer context for each PDN connection. As illustrated in FIG. 15(*c*), the EPS bearer context for each PDN connection includes an APN in Use, EPS PDN Charging Characteristics, a P-GW Address in Use (control information), a P-GW TEID for S5/S8 (control information), a P-GW Address in Use (user data), a P-GW GRE Key for uplink (user data), an S-GW IP address for S5/S8 (control information), an S-GW TEID for S5/S8 (control information), an S GW Address in Use (user data), a S-GW GRE Key for downlink traffic (user data), and a Default Bearer.

The EPS bearer context for each PDN connection may include a Mobility Type.

The APN in Use indicates APN which is recently used. This APN includes identification information about the APN network and identification information about a default operator. Additionally, this information is information acquired from the MME or the SGSN.

The EPS PDN Charging Characteristics indicate a charging performance. The EPS PDN Charging Characteristics may indicate, for example, normal, prepaid, a flat rate, or hot billing.

The P-GW Address in Use (control information) is an IP address of the PGW used when the SGW recently transmits the control information.

The P-GW TEID for S5/S8 (control information) is a TEID of the PGW used for transmission of the control information in the interface between the SGW and the PGW.

The P-GW Address in Use (user data) is an IP address of the PGW used when the SGW recently transmits the user data.

The P-GW GRE Key for uplink (user data) is the GRE key for the uplink communication of the user data of the interface between the SGW and the PGW.

The S-GW IP address for S5/S8 (control information) is an IP address of the SGW used for the interface of the control information between the SGW and the PGW.

The S-GW TEID for S5/S8 (control information) is a TEID of the SGW used for the interface of the control information between the GW and the PGW.

The S GW Address in Use (user data) is an IP address of the SGW which is recently used when the SGW transmits the user data.

The S-GW GRE Key for downlink traffic (user data) is the GRE key of the uplink communication used for the interface of the user data between the SGW and the PGW.

The Default Bearer is information that is acquired and/or generated when the PDN connection is established, and is identification information for identifying a default bearer associated with the PDN connection.

Furthermore, the EPS bearer context of the SGW includes the EPS bearer context for each bearer. FIG. 15(*d*) illustrates the EPS bearer context for each bearer. As illustrated in FIG. 15(*d*), the EPS bearer context for each bearer includes an EPS Bearer Id, a TFT, a P-GW Address in Use (user data), a P-GW TEID for 55/S8 (user data), an S-GW IP address for S5/S8 (user data), an S-GW TEID for S5/S8 (user data), an S-GW IP address for S1-u, S12 and S4 (user data), an S-GW TEID for S1-u, S12 and S4 (user data), an eNodeB IP address for S1-u, an eNodeB TEID for S1-u, an RNC IP address for S12, an RNC TEID for S12, an SGSN IP address for S4 (user data), an SGSN TEID for S4 (user data), an EPS Bearer QoS, and a Charging Id.

The EPS bearer context for each bearer may include a Mobility Type.

The EPS Bearer Id is the only identification information identifying the EPS bearer for the UE connection via the E-UTRAN. That is, the EPS Bearer Id is identification information for identifying the bearer. In other words, the EPS Bearer Id is identification information of the EPS bearer. The EPS Bearer Id may be identification information for identifying the SRB and/or the CRB, or may be identification information for identifying the DRB.

The TFT indicates all the packet filters associated with the EPS bearer. In other words, the TFT is information for identifying part of the user data transmitted and/or received, and the SGW_A 35 transmits and/or receives the user data identified by the TFT using the EPS bearer associated with the TFT. In further other words, the SGW_A 35 transmits and/or receives the user data identified by the TFT using the EPS bearer including the RB associated with the TFT.

Further, the SGW_A 35 may transmit and/or receive user data that cannot be identified with the TFT by using the default bearer.

Further, the SGW_A 35 may store in advance the TFT in association with the default bearer.

The P-GW Address in Use (user data) is an IP address of the PGW which is recently used for transmission of the user data ill the interface between the SGW and the PGW.

The P-GW TEID for S5/S8 (user data) is a TEID of the PGW for the interface of the user data between the SGW and the PGW.

The S-GW IP address for S5/S8 (user data) is an IP address of the SGW for the user data received from the PGW.

The S-GW TEID for S5/S8 (user data) is a TEID of the SGW for the interface of the user data between the SGW and the PGW.

The S-GW IP address for S1-u, S12 and S4 (user data) is an IP address of the SGW used for the interface between the SGW and the 3GPP access network (the LTE access network or GERAN/UTRAN).

In a case that the user data is transmitted and/or received while being included in a message for control information, the S-GW IP address for S1-u, S12 and S4 (user data) may be an IP address of the SGW used for an interface between the SGW and the MME and/or the SGSN, or may be the S-GW IP address for S11/S4.

The S-GW TEID for S1-u, S12 and S4 (user data) is a TEID of the SGW used for the interface between the SGW and the 3GPP access network (the LTE access network or GERAN/UTRAN).

In the case that the user data is transmitted and/or received while being included in a message for control information, the S-GW TEID for S1-u, S12 and S4 (user data) may be a TEID of the SGW used for an interface between the SGW and the MME and/or the SGSN, or may be S-GW TEID for S11/S4.

The eNodeB IP address for S1-u is an IP address of the eNB used for transmission between the SGW and the eNB.

In the case that the user data is transmitted and/or received while being included in a message for control information, the eNodeB IP address for S1-u may be an IP address of the MME used for an interface between the MME and the SGW, or may be the MME IP address for S11.

The eNodeB TEID for S1-u is a TEID of the eNB used for the transmission between the SGW and the eNB.

In the case that the user data is transmitted and/or received while being included in a message for control information, the eNodeB TEID for S1-u may be a TEID of the MME used for an interface between the MME and the SGW, or may be the MME TEID for S11.

The RNC IP address for S12 is an IP address of the RNC used for the interface between the SGW and the UTRAN.

The RNC TEID for S12 is a TEID of the RNC used for the interface between the SGW and the UTRAN.

The SGSN IP address for S4 (user data) is an IP address of the SGSN used for transmission of the user data between the SGW and the SGSN.

The SGSN TEID for S4 (user data) is a TEID of the SGSN used for the transmission of the user data between the SGW and the SGSN.

The EPS Bearer QoS represents the QoS of this bearer, and may include an ARP, a GBR, an MBR, and a QCI. Here, the ARP is information representing the priority relating to maintaining the bearer. Additionally, the Guaranteed Bit Rate (GBR) represents a band guaranteed bit rate, and the Maximum Bit Rate (MBR) represents the maximum bit rate. The QC1 can be classified in accordance with presence or absence of band control, an allowable delay time, a packet loss rate, or the like. The QCI includes information indicating the priority.

The Charging Id is identification information for recording charging generated in the SGW and the PGW.

1.2.4. PGW Configuration

Figures 16, 17:
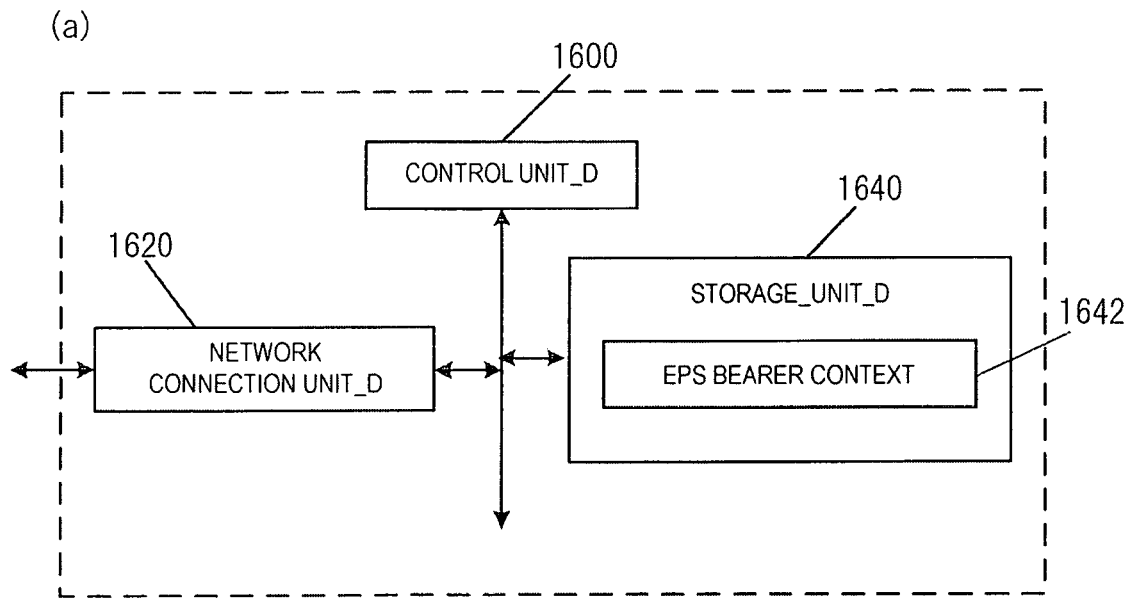
FIG. 16 is a diagram illustrating a device configuration of a PGW.
FIG. 17 is a diagram illustrating a storage unit of the PGW.

Hereinafter, the configuration of the PGW_A 30 will be described. FIG. 16(a) illustrates the device configuration of the PGW_A 30. As illustrated in FIG. 16(a), the PGW_A 30 includes a network connection unit_D 1620, a control unit_D 1600, and a storage unit_D 1640. The network connection unit_D 1620 and the storage unit_D 1640 are connected to the control unit_D 1600 via a bus.

The control unit_D 1600 is a function unit for controlling the PGW_A 30. The control unit_D 1600 implements various processes by reading out and performing various programs stored in the storage unit_D 1640.

The network connection unit_D 1620 is a function unit through which the PGW_A 30 is connected to the SGW_A 35 and/or the PCRF_A 60 and/or the ePDG_A 65 and/or the AAA_A 55 and/or the TWAG_A 74 and/or the PDN_A 5. In addition, the network connection unit_D 1620 is a transmission and/or reception function unit through which the PGW_A 30 transmits and/or receives user data and/or control data to/from the SGW_A 35 and/or the PCRF_A 60 and/or the ePDG_A 65 and/or the AAA_A 55 and/or the TWAG_A 74 and/or the PDN_A 5.

The storage unit_D 1640 is a function unit for storing programs, data, and the like necessary for each operation of the PGW_A 30. The storage unit_D 1640 is constituted of, for example, a semiconductor memory, a Hard Disk Drive (HDD), or the like.

The storage unit_D 1640 may store at least the identification information and/or the control information and/or the flag and/or the parameter included in the control message transmitted and/or received in the communication procedure, which will be described later.

As illustrated in FIG. 16(a), the storage unit_D 1640 stores an EPS bearer context 1642. Note that the EPS bearer context may be stored separately as an EPS bearer context stored for each UE, an EPS bearer context stored for each APN, an EPS bearer context stored for each PDN connection, and an EPS bearer context stored for each bearer.

FIG. 17(b) illustrates information elements included in the EPS bearer context stored for each UE. As illustrated in FIG. 17(b), the EPS bearer context stored for each UE includes an IMSI, an IMSI-unauthenticated-indicator, an ME Identity, an MSISDN, a Selected CN operator id, an RAT type, a Trace reference, a Trace type, a Trigger id, and an OMC identity.

The EPS bearer context for each UE may include a Mobility Type.

The IMSI is identification information to be assigned to a user using the UE.

The IMSI-unauthenticated-indicator is instruction information indicating that this IMSI is not authenticated.

The ME Identity is an ID of the UE, and may be the IMEI/IMISV, for example.

The MSISDN represents a basic phone number of the UE. The MSISDN is indicated by the storage unit of the HSS_A 50.

The Selected CN operator ID is identification information, which is used for sharing the network among operators, of a selected core network operator.

The RAT type indicates a recent Radio Access Technology (RAT) of the UE. The RAT type may be, for example, the E-UTRA (LTE), the UTRA, or the like.

The Trace reference is identification information for identifying a specific trace record or a record set.

The Trace type indicates a type of the trace. For example, the Trace type may indicate a type traced by the HSS and/or a type traced by the MME, the SGW, or the PGW.

The Trigger ID is identification information for identifying a constituent element for which the trace starts.

The OMC Identity is identification information for identifying the OMC which receives the record of the trace.

Next, FIG. 17(c) illustrates the EPS bearer context stored for each APN. As illustrated in the drawing, the EPS bearer context stored for each APN of the PGW storage unit includes an APN in use and an APN-AMBR.

The APN in Use indicates APN which is recently used. This APN includes identification information about the APN network and identification information about a default operator. This information is acquired from the SGW.

The APN-AMBR indicates the maximum value of the Maximum Bit Rate (MBR) of the uplink communication and the downlink communication for sharing all the Non-GBR bearers (non-guaranteed bearers) established for this APN.

FIG. 18(d) illustrates the EPS bearer context for each PDN connection stored for each PDN connection. As illustrated in FIG. 18(d), the EPS bearer context for each PDN connection includes an IP Address, a PDN type, an S-GW Address in Use (control information), an S-GW TEID for S5/S8 (control information), an S-GW Address in Use (user data), an S-GW GRE Key for downlink traffic (user data), a P-GW IP address for S5/S8 (control information), a P-GW TEID for S5/S8 (control information), a P-GW Address in Use (user data), a P-GW GRE Key for uplink traffic (user data), an MS Info Change Reporting support indication, an MS Info Change Reporting Action, a CSG Information Reporting Action, a Presence Reporting Area Action, a BCM, a Default Bearer, and EPS PDN Charging Characteristics.

The EPS bearer context for each PDN connection may include a Mobility Type.

The IP Address indicates an IP address assigned to the UE for this PDN connection. The IP address may be an IPv4 and/or IPv6 prefix.

The PDN type indicates the type of the IP address. The PDN type indicates IPv4, IPv6, or IPv4v6, for example.

The S-GW Address in Use (control information) is an IP address of the SGW which is recently used for transmission of the control information.

The S-GW TEID for S5/S8 (control information) is a TEID of the SGW used for transmission and/or reception of the control information between the SGW and the PGW.

The S-GW Address in Use (user data) is an IP address of the SGW which is recently used for transmission of the user data in the interface between the SGW and the PGW.

The S-GW GRE Key for downlink traffic (user data) is the GRE key which is assigned to be used in the downlink communication of the user data from the PGW to the SGW at the interface between the SGW and the PGW.

The P-GW IP address for S5/S8 (control information) is an IP address of the PGW used for communication of the control information.

The P-GW TEID for S5/S8 (control information) is a TEID of the PGW for communication of the control information which uses the interface between the SGW and the PGW.

The P-GW Address in Use (user data) is an IP address of the PGW which is recently used for transmission of the user data which uses the interface between the SGW and the PGW.

The P-GW GRE Key for uplink traffic (user data) is the GRE key which is assigned for the uplink communication of the user data between the SGW and the PGW, that is, transmission of the user data from the SGW to the PGW.

The MS Info Change Reporting support indication indicates that the MME and/or the SGSN supports a notification process of user location information and/or user CSG information.

The MS Info Change Reporting Action is information indicating whether the MME and/or the SGSN is requested to transmit a change in the user location information.

The CSG Information Reporting Action is information indicating whether the MME and/or the SGSN is requested to transmit a change in the user CSG information. This information is separately indicated (a) for a CSG cell, (b) for a hybrid cell in which a user is a CSG member, (c) for a hybrid cell in which the user is not the CSG member, or for a combination thereof.

The Presence Reporting Area Action indicates necessity of notification of the change as to whether the UE is present in a presence reporting area. This information element separates into identification information of the presence reporting area and an element included in the presence reporting area.

The Bearer Control Mode (BCM) indicates a control state of a bearer negotiated with respect to the GERAN/UTRAN.

The Default Bearer is information that is acquired and/or generated when the PDN connection is established, and is EPS bearer identification information for identifying a default bearer associated with the PDN connection.

The EPS PDN Charging Characteristics are a charging performance. The charging performance may indicate, for example, normal, prepaid, a flat rate, hot billing.

Furthermore, FIG. 19(e) illustrates the EPS bearer context stored for each EPS bearer. As illustrated in FIG. 19(e), the EPS bearer context includes an EPS Bearer Id, a TFT, an S-GW Address in Use (user data), an S-GW TEID for S5/S8 (user data), a P-GW IP address for S5/S8 (user data), a P-GW TEID for S5/S8 (user data), an EPS Bearer QoS, and a Charging Id.

The EPS context for each EPS bearer may include a Mobility Type.

The EPS Bearer Id is identification information identifying the access of the UE via the E-UTRAN. In other words, the EPS Bearer Id is identification information of the EPS bearer. In addition, the EPS Bearer Id may be identification information for identifying the SRB and/or the CRB, or may be identification information for identifying the DRB.

The TFT is an abbreviation of a "Traffic Flow Template", and indicates all packet filters associated with the EPS bearer. In other words, the TFT is information for identifying part of the user data transmitted and/or received, and the PGW_A 30 transmits and/or receives the user data identified by the TFT using the EPS bearer associated with the TFT. In further other words, the PGW_A 30 transmits and/or receives the user data identified by the TFT by using the EPS bearer including the RB associated with the TFT.

The PGW_A 30 may transmit and/or receive user data that cannot be identified with the TFT by using the default bearer.

The PGW_A 30 may store in advance the TFT in association with the default bearer.

The S-GW Address in Use (user data) is an IP address of the SGW which is recently used for transmission of the user data.

The S-GW TEID for S5/S8 (user data) is a TEID of the SGW for communication of the user data, which uses the interface between the SGW and the PGW.

The P-GW IP address for S5/S8 (user data) is an IP address of the PGW for the user data received from the PGW.

The P-GW TEID for S5/S8 (user data) is a TEID of the PGW for communication of the user data between the SGW and the PGW.

The EPS Bearer QoS indicates the QoS of the bearer, and may include an ARP, a GBR, an MBR, and a QCI. Here, the ARP is information representing the priority relating to maintaining the bearer. Additionally, the Guaranteed Bit Rate (GBR) represents a band guaranteed bit rate, and the Maximum Bit Rate (MBR) represents the maximum bit rate. The QCI can be classified in accordance with presence or absence of band control, an allowable delay time, a packet loss rate, or the like. The QCI includes information indicating the priority.

The Charging Id is charging identification information for identifying the record relating to charging generated in the SGW and the PGW.

1.2.5. UE Configuration

Figure 20:
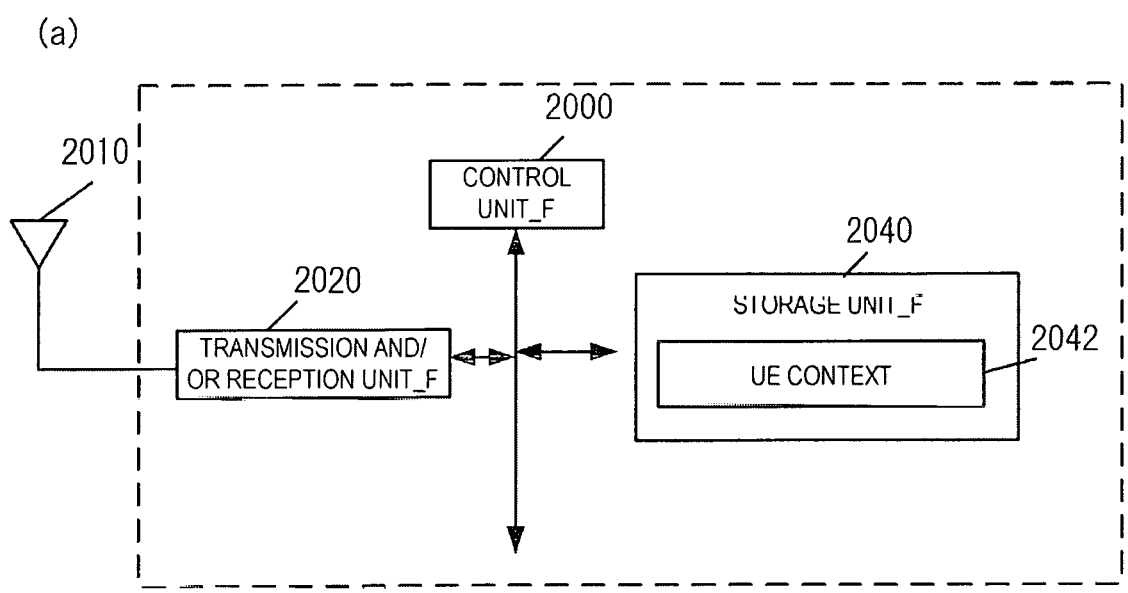
FIG. 20 is a diagram illustrating a device configuration of a UE.

FIG. 20(*a*) illustrates a device configuration of the UE_A 10. As illustrated in FIG. 20(*a*), the UE_A 10 includes a transmission and/or reception unit_F 2020, a control unit_F 2000, and a storage unit_F 2040. The transmission and/or reception unit_F 2020 and the storage unit_F 2040 are connected to the control unit_F 2000 via a bus.

The control unit_F 2000 is a function unit for controlling the UE_A 10. The control unit_F 2000 implements various processes by reading out and performing various programs stored in the storage unit_F 2040.

The transmission and/or reception unit_F 2020 is a function unit through which the UE_A 10 connects to an IP access network via an LTE base station. Furthermore, an external antenna_F 2010 is connected to the transmission and/or reception unit_F 2020.

In other words, the transmission and/or reception unit_F 2020 is a function unit through which the UE_A 10 connects to the eNB_A 45. In addition, the transmission and/or reception unit_F 2020 is a transmission and/or reception function unit with which the UE_A 10 transmits and/or receives the user data and/or the control data to/from the eNB_A 45.

The storage unit_F 2040 is a function unit for storing programs, data, and the like necessary for each operation of the UE_A 10. The storage unit_F 2040 is constituted of, for example, a semiconductor memory, a Hard Disk Drive (HDD), or the like.

The storage unit_F 2040 may store at least the identification information and/or the control information and/or the flag and/or the parameter included in the control message transmitted and/or received in the communication procedure, which will be described later.

As illustrated in FIG. 20(*a*), the storage unit_F 2040 stores a UE context 2042. Hereinafter, information elements stored in the storage unit_F 2040 will be described.

FIG. 21(*b*) illustrates information elements included in the UE context stored for each UE. As illustrated in FIG. 21(*b*), the UE context stored for each UE includes an IMSI, an EMM State, a GUTI, an ME Identity, a Tracking Area List, a last visited TAI, a Selected NAS Algorithm, a Selected AS Algorithm, an eKSI, K_ASME, NAS Keys and COUNT, a TIN, UE Specific DRX Parameters, an Allowed CSG list, and an Operator CSG list.

The UE context for each UE may include a Mobility Type.

The IMSI is permanent identification information of a subscriber.

The EMM State indicates a mobility management state of the UE. For example, the EMM State may be EMM-REGISTERED in which the UE is registered with the network (registered state) or EMM-DEREGISTERD in which the UE is not registered with the network (deregistered state).

GUTI is an abbreviation of "Globally Unique Temporary Identity," and is temporary identification information on the UE. The GUTI includes the identification information about the MME (Globally Unique MME Identifier (GUMMEI)) and the identification information about the UE in a specific MME (M-TMSI).

The ME Identity is an ID of an ME, and may be the IMEI/IMISV, for example.

The Tracking Area List is a list of the tracking area identification information which is assigned to the UE.

The last visited TAI is the tracking area identification information included in the Tracking Area List, and is identification information of the latest tracking area that the UE visits.

The Selected NAS Algorithm is a selected security algorithm of the NAS.

The Selected AS Algorithm is a selected security algorithm of the AS.

The eKSI is a key set indicating the K_ASME. The eKSI may indicate whether a security key acquired by a security authentication of the UTRAN or the E-UTRAN is used.

The K_ASME is a key for E-UTRAN key hierarchy generated based on the keys CK and IK.

The NAS Keys and COUNT includes the key K_NASint, the key K_NASenc, and the NAS COUNT. The K_NASint is a key for encryption between the UE and the MME, the K_NASenc is a key for safety protection between the UE and the MME. Additionally, the NAS COUNT is a count which starts a count in a case that a new key by which security between the UE and the MME is established is configured.

The Temporary Identity used in Next update (TIN) is temporary identification information used in the UE in an attach procedure or a location information update procedure (RAU/TAU).

The UE Specific DRX Parameters are a Discontinuous Reception (DRX) cycle length of the selected UE.

The Allowed CSG list is a list of the PLMN associated with a CSG ID of a member to which the allowed UE belongs, under the control of both the user and the operator.

The Operator CSG list is a list of the PLMN associated with the CSG ID of a member to which the allowed UE belongs, under the control of only the operator.

Next, FIG. 21(c) illustrates the UE context for each PDN connection stored for each PDN connection. As illustrated in FIG. 21(c), the UE context for each PDN connection includes an APN in Use, an APN-AMBR, an Assigned PDN Type, an IP Address, a Default Bearer, and a WLAN offloadability.

The UE context for each PDN connection may include a Mobility Type.

The APN in Use is APN recently utilized. This APN may include identification information about the network and identification information about a default operator.

The APN-AMBR indicates the maximum value of the MBR of the uplink communication and the downlink communication for sharing the Non-GBR bearers (non-guaranteed bearers). The APN-AMBR is established for each APN.

The Assigned PDN Type is a type of the PDN assigned from the network. The Assigned PDN Type may be IPv4, IPv6, or IPv4v6, for example.

The IP Address is an IP address assigned to the UE, and may be an IPv4 address or an IPv6 prefix.

The Default Bearer is information that is acquired from the core network_A 90 when the PDN connection is established, and is EPS bearer identification information for identifying a default bearer associated with the PDN connection.

The WLAN offloadability is WLAN offload permission information indicating whether to allow for offload to the WLAN using an interworking function between the WLAN and the 3GPP, or maintain the 3GPP access.

FIG. 21(d) illustrates the UE context for each bearer stored in the storage unit of the UE. As illustrated in the drawing, the UE context for each bearer includes an EPS Bearer ID, a TI, an EPS bearer QoS, and a TFT.

The UE context for each bearer may include a Mobility Type.

The EPS Bearer ID is identification information of the EPS bearer. The EPS Bearer ID may be identification information for identifying the SRB and/or the CRB, or may be identification information for identifying the DRB.

The TI is an abbreviation of a "Transaction Identifier", and is identification information identifying a bidirectional message flow (Transaction).

The TFT is an abbreviation of a "Traffic Flow Template", and indicates all packet filters associated with the EPS bearer. In other words, the TFT is information for identifying part of the user data transmitted and/or received, and the UE_A 10 transmits and/or receives the user data identified by the TFT by using the EPS bearer associated with the TFT. In further other words, the UE_A 10 transmits and/or receives the user data identified by the TFT by using the RB associated with the TFT.

Further, the UE_A 10 may transmit and/or receive user data that cannot be identified with the TFT by using the default bearer.

Further, the UE_A 10 may store in advance the TFT in association with the default bearer.

Further, the Mobility Type according to the present embodiment may be information indicating a granularity of the mobility.

1.3. Description of Communication Procedure

Next, a communication procedure according to the present embodiment will be described with reference to FIG. 22.

Figure 22:
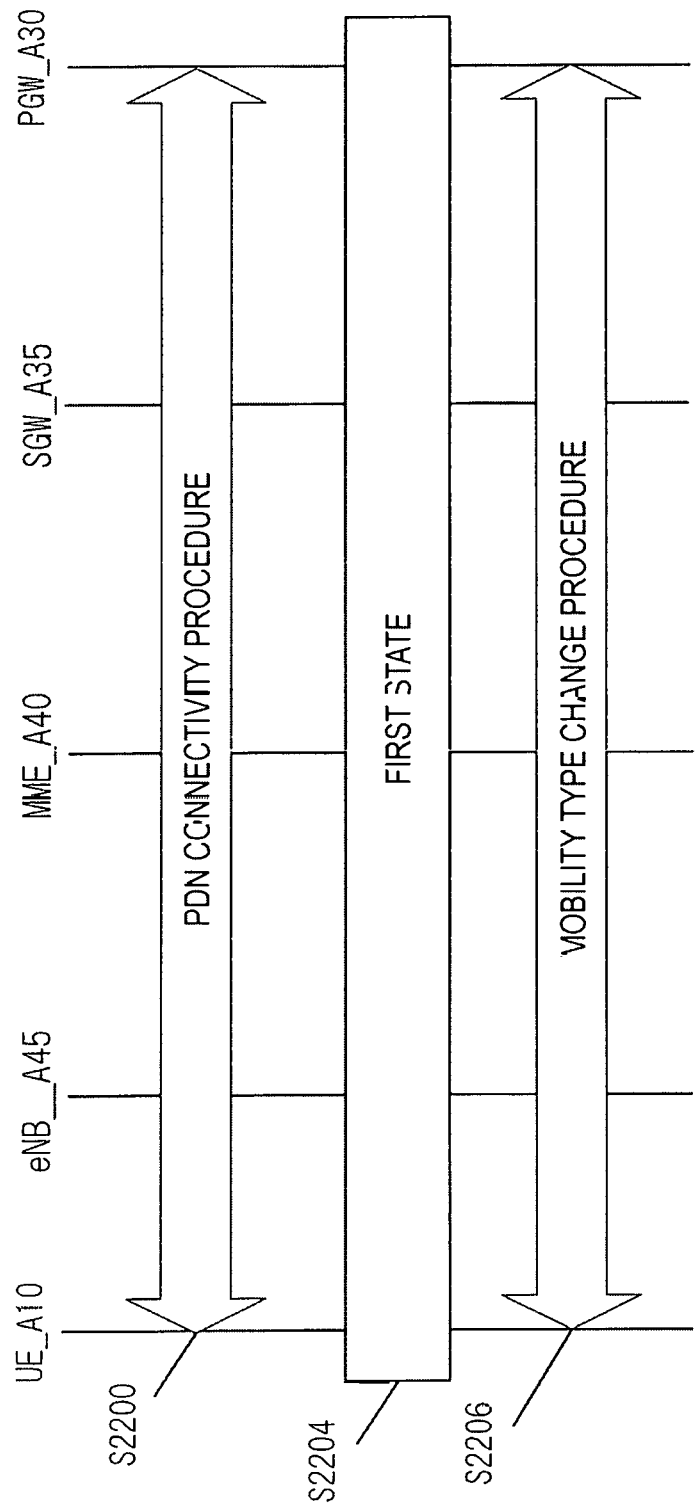
FIG. 22 is a diagram illustrating an outline of a communication procedure.

As illustrated in FIG. 22, in the communication procedure according to the present embodiment, a PDN connectivity procedure (S2200) is performed first. In the PDN connectivity procedure (S2200), the UE_A 10 and/or the eNB_A 45 and/or the MME_A 40 and/or the SGW_A 35 and/or the PGW_A 30 may establish a PDN connection or determine a Mobility Type of the UE_A 10.

Note that the PDN connectivity procedure in the present connectivity procedure may be performed in the attach procedure for the UE_A 10 to initially connect to the core network_A 90. In this case, the PDN connectivity request message may be transmitted and/or received while being included in the ATTACH REQUEST message that the UE_A 10 transmits to the MME_A 40. Additionally, the ACTIVATE DEFAULT EPS BEARER CONTEXT REQUEST message may be transmitted and/or received while being included in the ATTACH ACCEPT message that the MME_A 40 transmits to the UE_A 10. Additionally, the ACTIVATE DEFAULT EPS BEARER CONTEXT ACCEPT message may be transmitted and/or received while being included in the ATTACH COMPLETE message that the UE_A 10 transmits to the MME_A 40.

Figure 5:
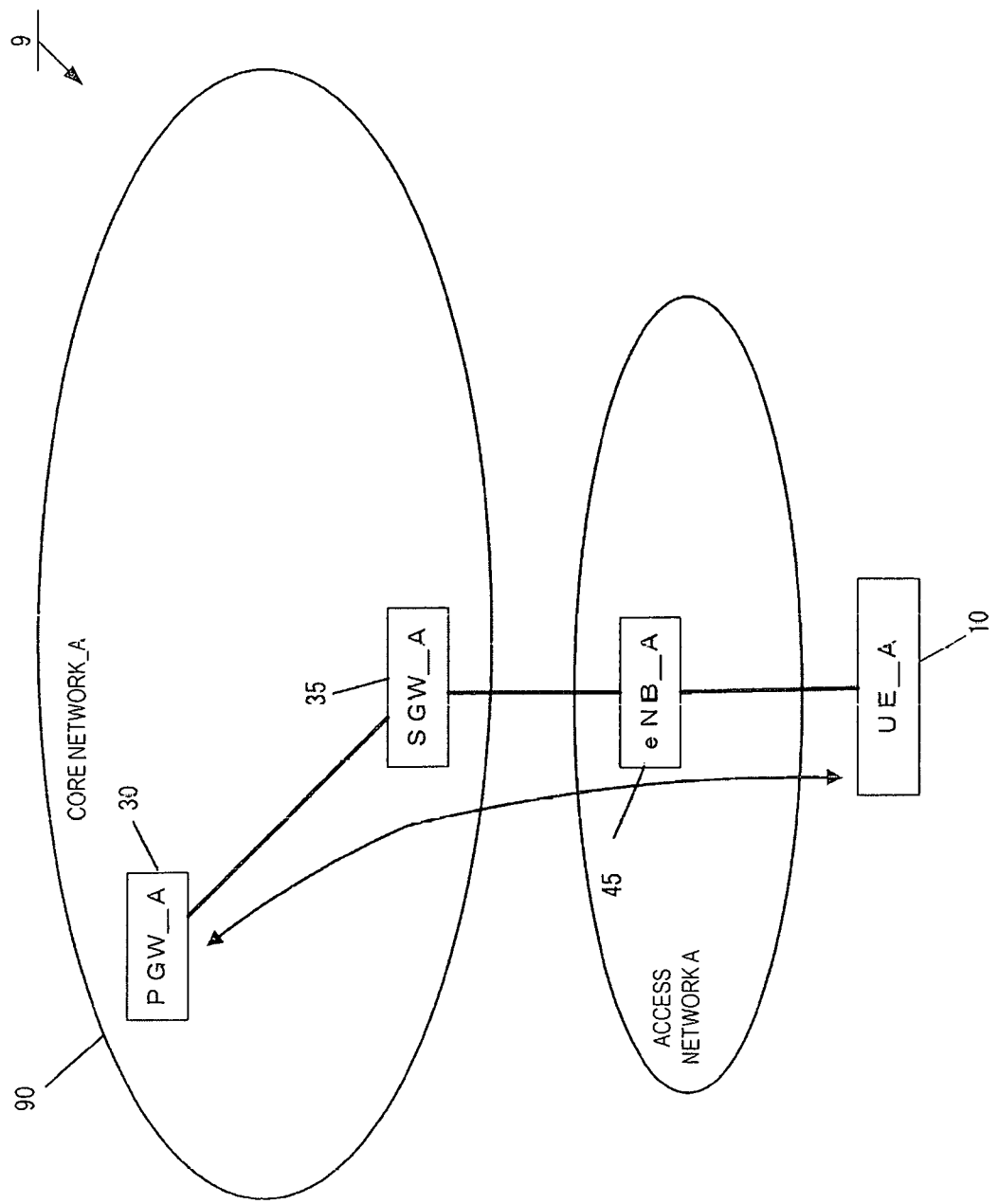
FIG. 5 is a diagram illustrating a PDN connection establishment state.

Based on completion of the attach procedure and/or the PDN connectivity procedure, each device (the UE_A 10 and/or the eNB_A 45 and/or the MME_A 40 and/or the SGW_A 35 and/or the PGW_A 30) changes its state to a first state (S2204). Here, as illustrated in FIG. 5, the first state may be a state in which each device has established the PDN connection. In addition, the first state may be a state in which the UE_A 10 is connected to the core network_A 90. Note that the first state may not be limited to these states. Further, the Packet Data network (PDN) connection may be a communication path that is established between the UE_A 10 and the PGW_A 30 and/or the PDN_A 5, or may be a Protocol Data Unit (PDU) or Packet Data Unit (PDU) session.

Next, a Mobility Type change procedure (S2206) may be performed. The UE_A 10 and/or the eNB_A 45 and/or the MME_A 40 and/or the SGW_A 35 and/or the PGW_A 30 may change the Mobility Type of the UE_A 10 through the Mobility Type change procedure.

Here, before describing the detailed steps of each procedure, in order to avoid redundant descriptions, terms specific to the present embodiment and primary identification information used in each procedure will be described beforehand.

The Mobility Type according to the present embodiment may be information indicating a granularity of the mobility.

Further, the UE_A 10 and/or the MME_A 40 may manage information indicating capability relating to the mobility of the UE_A 10. Note that the information indicating capability relating to the mobility of the UE_A 10 may be information indicated using a Mobility Type. In other words, the identification information and the Mobility Type of the UE_A 10 may be managed in association with each other. Note that in the present embodiment, description is given on the assumption that first identification information is such information indicating capability relating to the mobility of the UE_A 10.

The UE_A 10 and/or the MME_A 40 may manage information indicating capability relating to the mobility of the core network_A 90. Note that the information indicating capability relating to the mobility of the core network_A 90 may be information indicated using a Mobility Type. In other words, the identification information and the Mobility Type of the core network_A 90 may be managed in association with each other. Note that in the present embodiment, description is given on the assumption that second identification information is such information indicating capability relating to the mobility of the core network_A 90.

The UE_A 10 and/or the MME_A 40 may manage information indicating the mobility requested by the UE_A 10. Note that the information indicating the mobility requested by the UE_A 10 may be information indicated using a Mobility Type. In other words, the identification information and the Mobility Type of the UE_A 10 may be managed in association with each other. Note that in the present embodiment, description is given on the assumption that third identification information is such information indicating the mobility requested by the UE_A 10.

The UE_A 10 and/or the MME_A 40 may manage information indicating capability relating to the mobility of the core network_A 90. Note that the information indicating the mobility that the core network_A 90 allows to the UE_A 10 may be information indicated using a Mobility Type. In other words, the identification information and the Mobility Type of the UE_A 10 may be managed in association with each other. Here, the Mobility Type that the core network_A 90 allows may be a Mobility Type that the MME_A 40 allows based on an operator policy, subscriber information, or the like. Therefore, the Mobility Type that the core network_A 90 allows may in other words be a Mobility Type that the MME_A 40 and/or the operator policy and/or the subscriber information allow(s). Note that in the present embodiment, description is given on the assumption that fourth identification information is such information indicating the mobility that the core network_A 90 allows to the UE_A 10.

The UE_A 10 and/or the MME_A 40 may manage information indicating mobility that is requested with respect to the communication path established by the UE_A 10, such as the PDN connection or the EPS bearer. Note that the information indicating the mobility that is requested with respect to the communication path established by the UE_A 10, such as the PDN connection or the EPS bearer, may be information indicated using a Mobility Type. In other words, identification information of the communication path established by the UE_A 10 and the Mobility Type may be managed in association with each other. Here, the identification information of the communication path may be identification information for identifying a PDN connection, such as APN, an IP address, or a PDN connection ID, identification information of the EPS bearer, such as an EPS bearer ID, or the like. Note that in the present embodiment, description is given on the assumption that fifth identification information is such information indicating the mobility that is requested with respect to the communication path established by the UE_A 10, such as the PDN connection or the EPS bearer.

The UE_A 10 and/or the MME_A 40 may manage information indicating mobility that is allowed with respect to the communication path established by the UE_A 10, such as the PDN connection or the EPS bearer. Note that the information indicating the mobility that is allowed with respect to the communication path established by the UE_A 10, such as the PDN connection or the EPS bearer, may be information indicated using a Mobility Type. In other words, identification information of the communication path established by the UE_A 10 and the Mobility Type may be managed in association with each other. Here, the identification information of the communication path may be identification information for identifying a PDN connection, such as APN, an IP address, or a PDN connection ID, identification information of the EPS bearer, such as an EPS bearer ID, or the like. Note that in the present embodiment, description is given on the assumption that sixth identification information is such information indicating the mobility that is allowed with respect to the communication path established by the UE_A 10, such as the PDN connection or the EPS bearer.

The UE_A 10 and/or the MME_A 40 may manage information indicating that information indicating the mobility after establishment of the PDN connection of the UE_A 10 is allowed to be changed. Note that the information indicating that information indicating the mobility after establishment of the PDN connection of the UE_A 10 is allowed to be changed may be information indicated using a Mobility Type. In other words, the identification information and the Mobility Type of the UE_A 10 may be managed in association with each other. Note that in the present embodiment, description is given on the assumption that seventh identification information is such information indicating that information indicating the mobility after establishment of the PDN connection of the UE_A 10 is allowed to be changed.

The UE_A 10 and/or the MME_A 40 may manage information indicating that information indicating the mobility after establishment of the PDN connection of the core network_A 90 is allowed to be changed. Note that the information indicating that information indicating the mobility after establishment of the PDN connection of the core network_A 90 is allowed to be changed may be information indicated using a Mobility Type. In other words, the identification information and the Mobility Type of the core network_A 90 may be managed in association with each other. Note that in the present embodiment, description is given on the assumption that eighth identification information is such information indicating that information indicating the mobility after establishment of the PDN connection of the core network_A 90 is allowed to be changed.

The UE_A 10 and/or the MME_A 40 may manage information indicating that information indicating a mobility is requested to be changed. Note that the information indicating that information indicating a mobility is requested to be changed may be information indicated using a Mobility Type after the requested change. In other words, the identification information of the UE_A 10 and/or the core network_A 90 and the Mobility Type after the requested change may be managed in association with each other. The change of the information indicating a mobility may be carried out with respect to the UE_A 10 and/or the core network_A 90, or may be carried out with respect to the communication path for the UE_A 10 and/or the core network_A 90. Note that in the present embodiment, description is given on the assumption that ninth identification information is such information indicating that information indicating a mobility is requested to be changed.

The UE_A 10 and/or the MME_A 40 may manage information indicating that change of the information indicating a mobility has been approved. Note that the information indicating that change of the information indicating a mobility has been approved may be information indicated using a Mobility Type after the approved change. In other words, the identification information of the UE_A 10 and/or the core network_A 90 and the Mobility Type after the approved change may be managed in association with each other. The change of the information indicating a mobility may be carried out with respect to the UE_A 10 and/or the core network_A 90, or may be carried out with respect to the communication path(s) that the UE_A 10 and/or the core network_A 90 has/have. Note that in the present embodiment, description is given on the assumption that tenth identification information is such information indicating that change of the information indicating a mobility has been approved.

Here, the first identification information may be identification information configured for the UE_A 10 in advance.

The second identification information may be identification information configured for the core network_A 90 and/or the MME_A 40 in accordance with an operator policy or an operation by a network operator.

The third identification information may be identification information configured for the UE_A 10 in advance, or may be identification information determined based on the first identification information. Therefore, the third identification information may be the same Mobility Type as the first identification information. Alternatively, the third identification information may be a different Mobility Type from the first identification information, which is configured in accordance with a UE policy.

The fourth identification information may be identification information configured for the core network_A 90 and/or the MME_A 40 in accordance with an operator policy or an operation by a network operator. In addition, the fourth identification information may be identification information determined based on the third identification information.

The fifth identification information may be identification information configured for the UE_A 10 in advance, or may be identification information determined based on the first identification information. Therefore, the fifth identification information may be the same Mobility Type as the first identification information. Alternatively, the fifth identification information may be a different Mobility Type from the first identification information, which is configured in accordance with a UE policy. In addition, the fifth identification information may be identification information determined in accordance with an application. Note that the UE_A 10 is capable of establishing multiple communication paths, and the UE_A 10 may store the fifth identification information indicating a different Mobility Type for each communication path.

The sixth identification information may be identification information configured for the core network_A 90 and/or the MME_A 40 in accordance with an operator policy or an operation by a network operator. In addition, the sixth identification information may be identification information determined based on the first identification information. In addition, the sixth identification information may be identification information determined in accordance with an application. Note that the UE_A 10 is capable of establishing multiple communication paths, and the core network_A 90 may store the sixth identification information indicating a different Mobility Type for each communication path. The UE_A 10 may store one or more of such identification information in the UE context. Furthermore, the UE_A 10 may store the fifth identification information and/or the sixth identification information in the UE context for each PDN connection. More specifically, such identification information may be stored in association with information for identifying an application, information for identifying a flow, such as a Traffic Flow Template (TFT), or bearer identification information, such as an EPS bearer ID.

The seventh identification information may be identification information configured for the UE_A 10 in advance, or may be identification information determined based on a UE policy.

The eighth identification information may be identification information configured for the core network_A 90 and/or the MME_A 40 in accordance with an operator policy or an operation by a network operator. In addition, the eighth identification information may be identification information determined based on the seventh identification information.

The ninth identification information may be identification information determined based on one or more from among the first to sixth identification information and/or a UE policy and/or an operator policy or an operation by a network operator. Therefore, the ninth identification information may be the same Mobility Type as the first identification information and/or the third identification information and/or the fifth identification information, and may be a different Mobility Type from the second identification information and/or the fourth identification information and/or the sixth identification information. The ninth identification information may be a different Mobility Type from the first identification information and/or the third identification information and/or the fifth identification information, and may be the same Mobility Type as the second identification information and/or the fourth identification information and/or the sixth identification information.

The tenth identification information may be identification information determined based on the ninth identification information and/or a UE policy and/or an operator policy or an operation by a network operator. Therefore, the tenth identification information may be the same Mobility Type as the ninth identification information, or may be a different Mobility Type from the ninth identification information. The tenth identification information may be identification information indicating that change of a Mobility Type has been approved, identification information indicating that change of the Mobility Type has not been approved, or identification information indicating the reason for which change of the Mobility Type has not been approved.

Note that the UE_A 10 may store one or more of such identification information in the UE context. Furthermore, the UE_A 10 may store the fifth identification information and/or the sixth identification information in the UE context for each PDN connection. More specifically, such identification information may be stored in association with information for identifying an application, information for identifying a flow, such as a Traffic Flow Template (TFT), or bearer identification information, such as an EPS bearer ID.

Furthermore, the MME_A 40 may store one or more of such identification information in the MME context. Furthermore, the MME_A 40 may store the fifth identification information and/or the sixth identification information in the MME context for each PDN connection. More specifically, such identification information may be stored in association with information for identifying an application, information for identifying a flow, such as a Traffic Flow Template (TFT), or bearer identification information, such as an EPS bearer ID.

Next, specific examples of a Mobility Type will be described. For example, a first type may be a type indicating that the core network_A 90 supports mobility of the UE_A 10 in the 3GPP access network.

A second type may be a type indicating that mobility of the UE_A 10 in a non-3GPP access network is supported.

A third type may be a type indicating that the core network_A 90 supports mobility of the UE_A 10 between the 3GPP access network and the non-3GPP access network.

A fourth type may be information indicating that mobility of the UE_A 10 is not supported.

A fifth type may be a type indicating that handover during an active mode is supported.

A sixth type may be a type indicating that handover during the active mode is not allowed.

The sixth type may be a type indicating that handover during the active mode is not allowed and handover during an idle mode is allowed.

A seventh type may be a type indicating that handover during the idle mode is allowed.

Note that information indicated by Mobility Types is not limited to the above. Further, a combination of any of the first to seventh types above may constitute one of the Mobility Types.

Note that the Mobility Types corresponding to respective pieces of identification information described above may be different Mobility Types from each other or may be the same Mobility Type.

Note that in a case that the UE_A 10 and/or the eNB_A 45 and/or the MME_A 40 and/or the SGW_A 35 and/or the PGW_A 30 holds the respective pieces of identification information, the UE_A 10 and/or the eNB_A 45 and/or the MME_A 40 and/or the SGW_A 35 and/or the PGW_A 30 may have capability indicated by the respective pieces of identification information.

In the present embodiment, in a case that two or more kinds of identification information among the first to eighth identification information are transmitted while being included in the same control message, respective pieces of identification information may be included in the control message and transmitted, or one kind of identification information having meanings of respective pieces of identification information may be included in the control message.

Note that each piece of identification information may be an information element configured as the flag or the parameter.

1.3.1. Examples of PDN Connectivity Procedure

Next, examples of the PDN connectivity procedure will be described. Note that the PDN connectivity procedure is a procedure initiated by the UE_A 10 to start. Note that the PDN connectivity procedure is a procedure for establishing the communication path via which the UE_A 10 transmits and/or receives user data to/from the PDN_A 5. In other words, the PDN connectivity procedure is a procedure for establishing a PDN connection that the UE_A 10 uses for transmitting and/or receiving user data to/from the PGW_A 30.

Note that the UE_A 10 may perform the PDN connectivity procedure within an attach procedure performed at the time of an initial connection to the core network_A 90, such as when powering on a terminal. Alternatively, the PDN connectivity procedure may be performed at an intended timing after the attach.

In accordance with the completion of the PDN connectivity procedure, the UE_A 10 establishes the PDN connection with the PGW 30.

Note that the UE_A 10 and/or the core network_A 90 can establish multiple PDN connections by performing the PDN connectivity procedure multiple times.

The UE_A 10 and/or the core network_A 90 may perform the PDN connectivity procedure while including, in respective ones of messages, identification information indicating a different Mobility Type from the already-established PDN connection, thereby newly establishing a PDN connection of different Mobility Type. Note that identification information indicating a different Mobility Type from the already-established PDN connection may be any among the first to eighth identification information.

Alternatively, a Mobility Type may be determined not for each establishment of a PDN connection, but a Mobility Type may be determined in a PDN connectivity procedure performed at the time of an attach procedure so that all PDN connections that are established thereafter may use the same Mobility Type.

Specifically, the PDN connectivity procedure performed after the attach procedure may not transmit and/or receive respective pieces of identification information for determining the Mobility Type, and may not perform each process based on the transmission and/or reception of respective pieces of identification information. In other words, a Mobility Type for the UE_A 10 may be determined in a PDN connectivity procedure performed within the attach procedure.

Next, details of the examples of the PDN connectivity procedure will be described.

Figure 23:
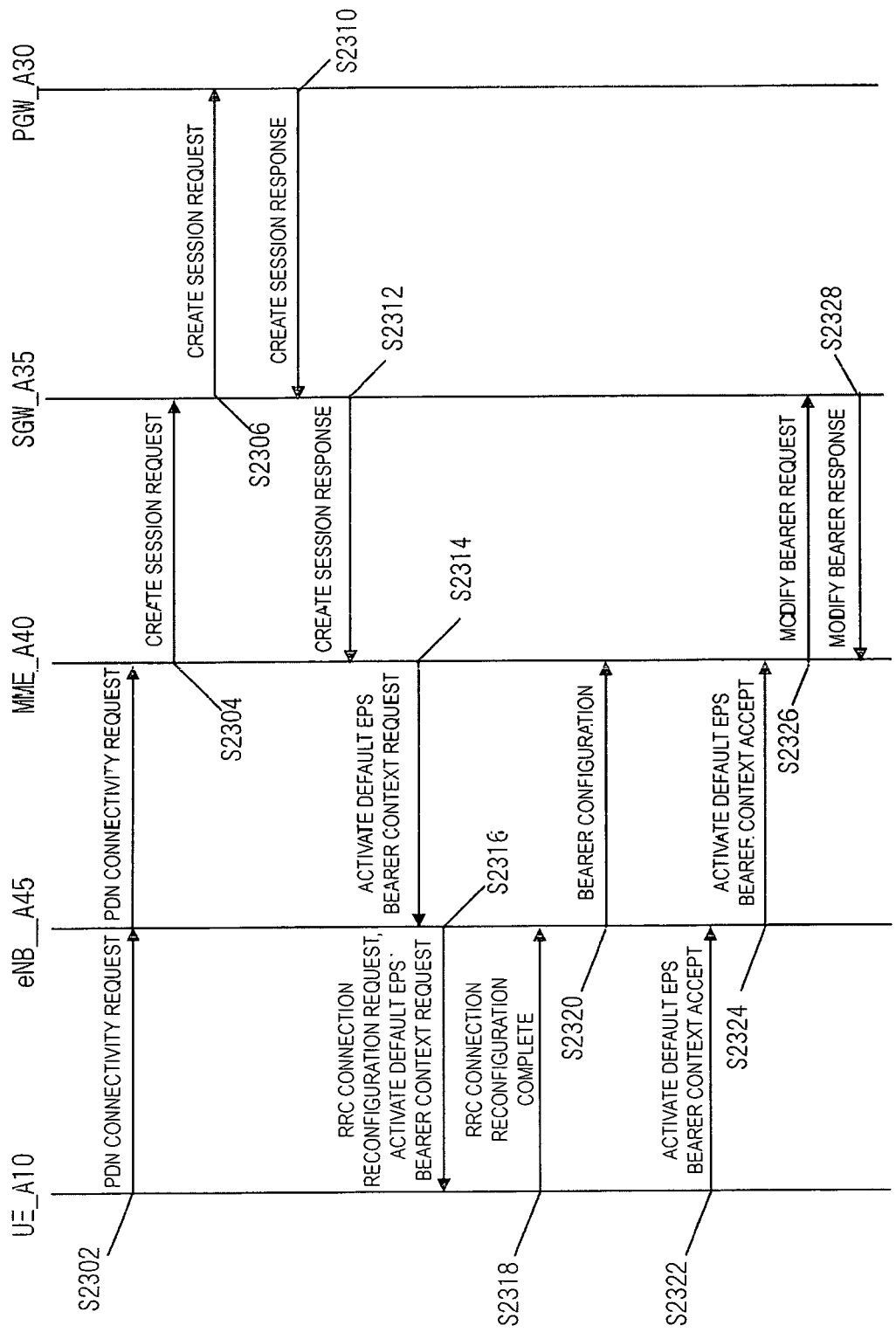
FIG. 23 is a diagram illustrating a PDN connectivity procedure.

Examples of steps of the PDN connectivity procedure will be described below with reference to FIG. 23.

First, the UE_A 10 transmits a PDN connectivity request message to the MME_A 40 (S2302). Note that the UE_A 10 may transmit the PDN connectivity request message to the eNB_A 45, and the transmitted PDN connectivity request message may be transferred to the MME_A 40 via the eNB_A 45.

The UE_A 10 may include at least the first identification information and/or the third identification information and/or the fifth identification information and/or the seventh identification information in the PDN connectivity request message. By transmitting the PDN connectivity request message while including the first identification information and/or the third identification information and/or the fifth identification information and/or the seventh identification information in the PDN connectivity request message, the UE_A 10 may request establishment of a PDN connection for which a Mobility Type can be changed, or may indicate the requested Mobility Type of the UE_A 10.

For example, the UE_A 10 may request establishment of a PDN connection and/or default bearer of a Mobility Type corresponding to any type from among the first to seventh types and/or a type obtained by combining any of the first to seventh types as a Mobility Type of the UE_A 10.

Further, the UE_A 10 may request establishment of a PDN connection and/or a default bearer of a Mobility Type other than the first to seventh types instead of any type from among the first to seventh types.

Further, the UE_A 10 may transmit an APN while being included in the PDN connectivity request message. Note that the UE_A 10 may include different APNs in the PDN connectivity request message to request establishment of different PDN connections.

Alternatively, in the case of performing the PDN connectivity procedure in the attach procedure, the UE_A 10 may notify the core network_A 90 of the APN using a different method. For example, instead of including the APN in the PDN connectivity request message, the UE_A 10 may transmit the APN while being included in another control message that the UE_A 10 transmits to the core network_A 90 in the attach procedure.

The MME_A 40 receives the PDN connectivity request message. In addition, based on the reception of the PDN connectivity request message, the MME_A 40 acquires the first identification information and/or the third identification information and/or the fifth identification information and/or the seventh identification information.

Based on information included in the PDN connectivity request message and/or the subscriber information and/or the operator policy and/or the identification information held by the MME_A 40, the MME_A 40 may determine establishment of a PDN connection with the UE_A 10 and/or determine a Mobility Type of the UE_A 10.

For example, the MME_A 40 may determine the Mobility Type indicated by the third identification information and/or the fifth identification information as the Mobility Type of the UE_A 10.

Further, instead of the Mobility Type indicated by the third identification information and/or the fifth identification information, the MME_A 40 may determine a default Mobility Type and/or a Mobility Type based on the subscriber information or the operator policy as the Mobility Type of the UE_A 10.

Further, based on the reception of the first identification information and/or the seventh identification information, the MME_A 40 may determine that a PDN connection and/or a default bearer for which the Mobility Type can be changed is to be established.

Note that the MME_A 40 may indicate any type from among the first to seventh types and/or a type obtained by combining any of the first to seventh types as the Mobility Type of the UE_A 10.

The MME_A 40 may indicate a type other than the first to seventh types, instead of any type from among the first to seventh types, as the Mobility Type of the UE_A 10.

Note that the Mobility Type of the UE_A 10 may be a Mobility Type corresponding to the PDN connection to be established, a Mobility Type corresponding to the default bearer, or a Mobility Type corresponding to the EPS bearer.

The MME_A 40 may transmit the determined Mobility Type of the UE_A 10 while being included in the fourth identification information and/or the sixth identification information.

Furthermore, the MME_A 40 may transmit the fourth identification information and/or the sixth identification information while associating with a TFT.

Note that determination of the Mobility Type of the UE_A 10 is not limited to the above.

Based on the reception of the PDN connectivity request message and/or the determination of the Mobility Type, the MME_A 40 transmits a create session request message to the SGW_A 35 (S2304).

The MME_40 may transmit at least the first identification information and/or the third identification information and/or the fifth identification information and/or the seventh identification information and/or the fourth identification information and/or the sixth identification information while being included in the create session request message.

Here, in the description above, the MME_A 40 is described as determining the Mobility Type, but in place of the MME_A 40, the PGW_A 30 may determine the Mobility Type of the UE_A 10. In this case, the MME_A 40 may transmit the create session request message without including the fourth identification information and/or the sixth identification information.

The SGW_A 35 receives the create session request message. In addition, based on the reception of the create session request message, the SGW_A 35 acquires the first identification information and/or the third identification information and/or the fifth identification information and/or the seventh identification information and/or the fourth identification information and/or the sixth identification information.

Based on the reception of the create session request message, the SGW_A 35 transmits the create session request message to the PGW_A 30 (S2306).

The SGW_A 35 may transmit at least the first identification information and/or the third identification information and/or the fifth identification information and/or the seventh identification information and/or the fourth identification information and/or the sixth identification information while being included in the create session request message.

The PGW_A 30 receives the create session request message. In addition, based on the reception of the create session request message, the PGW_A 30 acquires the first identification information and/or the third identification information and/or the fifth identification information and/or the seventh identification information and/or the fourth identification information and/or the sixth identification information.

Based on information included in the create session request message and/or the subscriber information and/or the operator policy and/or the identification information held by the PGW_A 30, the PGW_A 30 may determine the Mobility Type for the UE_A 10.

For example, the PGW_A 30 may determine the Mobility Type indicated by the third identification information and/or the fifth identification information as the Mobility Type of the UE_A 10.

Instead of the Mobility Type indicated by the third identification information and/or the fifth identification information, the PGW_A 30 may determine a default Mobility Type and/or a Mobility Type based on the subscriber information or the operator policy as the Mobility Type of the UE_A 10.

Based on the reception of the first identification information and/or the seventh identification information, the PGW_A 30 may determine that a PDN connection and/or a default bearer for which the Mobility Type can be changed is to be established.

Note that the PGW_A 30 may indicate any type from among the first to seventh types and/or a type obtained by combining any of the first to seventh types as the Mobility Type of the UE_A 10.

The PGW_A 30 may indicate a type other than the first to seventh types instead of any type from among the first to seventh types as the Mobility Type of the UE_A 10.

Note that the Mobility Type of the UE_A 10 may be a Mobility Type corresponding to the PDN connection to be established, a Mobility Type corresponding to the default bearer, or a Mobility Type corresponding to the EPS bearer.

The PGW_A 30 may transmit the determined Mobility Type of the UE_A 10 while being included in the fourth identification information and/or the sixth identification information.

Furthermore, the PGW_A 30 may transmit the fourth identification information and/or the sixth identification information while associating a TFT.

Note that determination of the Mobility Type of the UE_A 10 is not limited to the above.

Here, in the description above, a case is described that the PGW_A 30 determines the Mobility Type of the UE_A 10, but in a case that the MME_A 40 has determined the Mobility Type of the UE_A 10, the PGW_A 30 may not determine a Mobility Type of the UE_A 10.

In other words, in the case that the PGW_A 30 has received the fourth identification information and/or the sixth identification information, the PGW_A 30 may not determine the Mobility Type of the UE_A 10.

Based on the reception of the create session request message and/or the determination of the Mobility Type, the PGW_A 30 transmits a create session response message to the SGW_A 35 (S2310).

The PGW_A 30 may include at least the second identification information and/or the fourth identification and/or the sixth identification information and/or the eighth identification information in the create session response message.

Note that the create session response message may be a response message corresponding to the create session request message.

The SGW_A 35 receives the create session response message. In addition, based on the reception of the create session response message, the SGW_A 35 acquires the second identification information and/or the fourth identification information and/or the sixth identification information and/or the eighth identification information.

Based on the reception of the create session response message, the SGW_A 35 transmits the create session response message to the MME_A 40 (S2312)

The SGW_A 35 may include at least the second identification information and/or the fourth identification information and/or the sixth identification information and/or the eighth identification information in the create session response message.

The MME_A 40 receives the create session response message. In addition, based on the reception of the create session response message, the MME_A 40 acquires the second identification information and/or the fourth identification information and/or the sixth identification information and/or the eighth identification information.

Based on the reception of the create session response message, the MME_A 40 transmits an ACTIVATE DEFAULT EPS BEARER CONTEXT REQUEST message to the eNB_A 45 (S2314).

The MME_A 40 may include at least the second identification information and/or the fourth identification information and/or the sixth identification information and/or the eighth identification information in the ACTIVATE DEFAULT EPS BEARER CONTEXT REQUEST message.

Note that the ACTIVATE DEFAULT EPS BEARER CONTEXT REQUEST message may be a response message to the PDN connectivity request message.

The MME_A 40 may transmit an APN and/or a PDN address and/or an EPS bearer ID while being included in the ACTIVATE DEFAULT EPS BEARER CONTEXT REQUEST message.

Note that the MME_A 40 may include an APN and/or a PDN address and/or an EPS bearer ID in the ACTIVATE DEFAULT EPS BEARER CONTEXT REQUEST message to identify a PDN connection and/or a default bearer to be established. For example, the MME_A 40 may include different APNs and/or different PDN addresses and/or different EPS bearer IDs in the ACTIVATE DEFAULT EPS BEARER CONTEXT REQUEST message to indicate that different PDN connections are to be established.

In addition, the MME_A 40 may store the transmitted APN and/or PDN address and/or EPS bearer ID in the MME context.

The MME_A 40 may store the information indicated by respective pieces of transmitted identification information in association with the transmitted APN and/or PDN address and/or EPS bearer ID.

The eNB_A 45 receives the ACTIVATE DEFAULT EPS BEARER CONTEXT REQUEST message and transmits to the UE_A 10 an RRC message including the ACTIVATE DEFAULT EPS BEARER CONTEXT REQUEST message (S2316). Note that the RRC message may be an RRC connection reconfiguration request message.

The UE_A 10 receives the RRC message including the ACTIVATE DEFAULT EPS BEARER CONTEXT REQUEST message. Furthermore, in a case that the second identification information and/or the fourth identification information and/or the sixth identification information and/or the eighth identification information is included in the ACTIVATE DEFAULT EPS BEARER CONTEXT REQUEST message, the UE_A 10 acquires respective pieces of identification information.

Based on the reception of the ACTIVATE DEFAULT EPS BEARER CONTEXT REQUEST message, the UE_A 10 may receive the APN and/or the PDN address and/or the EPS bearer ID.

Note that based on the received APN and/or PDN address and/or EPS bearer ID, the UE_A 10 may identify a PDN connection and/or a default bearer to be established. For example, based on reception of different APNs and/or different PDN addresses and/or different EPS bearer IDs, the UE_A 10 may identify establishment of different PDN connections and/or different default bearers.

The UE_A 10 may store the received APN and/or PDN address and/or EPS bearer ID in the UE context.

The UE_A 10 may store the information indicated by respective pieces of received identification information in association with the received APN and/or PDN address and/or EPS bearer ID.

Based on the reception of the ACTIVATE DEFAULT EPS BEARER CONTEXT REQUEST message and/or the information included in the ACTIVATE DEFAULT EPS BEARER CONTEXT REQUEST message, the UE_A 10 may identify establishment of a PDN connection and/or a default bearer for which the Mobility Type can be changed and/or identify the determined Mobility Type of the UE_A 10.

More specifically, based on the reception of the second identification information and/or the eighth identification information, the UE_A 10 may identify that a PDN connection and/or a default bearer for which the Mobility Type can be changed has been established.

The UE_A 10 may identify the Mobility Type indicated by the received fourth identification information and/or sixth identification information as the Mobility Type of the UE_A 10.

In order to respond to the received RRC message, the UE_A 10 transmits an RRC message to the eNB_A 45 (S2318). The RRC message may be an RRC connection reconfiguration complete message.

The eNB_A 45 receives an RRC connection reconfiguration message, and transmits a bearer configuration message to the MME_A 40, based on the reception (S2320).

Further, based on the reception of the ACTIVATE DEFAULT EPS BEARER CONTEXT REQUEST message, the UE_A 10 transmits the RRC message including an ACTIVATE DEFAULT EPS BEARER CONTEXT ACCEPT message to the eNB_A 45 (S2322). Here, the ACTIVATE DEFAULT EPS BEARER CONTEXT ACCEPT message may be a response message to the ACTIVATE DEFAULT EPS BEARER CONTEXT REQUEST message.

Note that the RRC message transmitted while including the ACTIVATE DEFAULT EPS BEARER CONTEXT ACCEPT message may be a Direct Transfer message.

The eNB_45 receives the RRC message including the ACTIVATE DEFAULT EPS BEARER CONTEXT ACCEPT message and transmits the ACTIVATE DEFAULT EPS BEARER CONTEXT ACCEPT message to the MME_A 40 (S2324).

The MME_A 40 receives the ACTIVATE DEFAULT EPS BEARER CONTEXT ACCEPT message.

Based on the reception of the ACTIVATE DEFAULT EPS BEARER CONTEXT ACCEPT message, the MME_A 40 may transmit a modify bearer request message to the SGW_A 35 (S2326).

The SGW_A 35 receives the modify bearer request message.

Based on the reception of the modify bearer request message, the SGW_A 35 transmits a modify bearer response message to the MME_A 40 (S2328).

Note that the modify bearer response message may be a response message to the modify bearer request message.

The MME A 40 receives the modify bearer response message.

By the above-described steps, the UE_A 10 connects to the network, and completes the PDN connectivity procedure. According to the completion of the PDN connectivity procedure, the UE_A 10 and/or the core network_A 90 establishes a PDN connection and/or a default bearer. Further, according to the completion of the PDN connectivity procedure, the UE_A 10 and/or the core network_A 90 may establish an EPS bearer.

In other words, based on the transmission and/or reception of the ACTIVATE DEFAULT EPS BEARER CONTEXT REQUEST message and/or the ACTIVATE DEFAULT EPS BEARER CONTEXT ACCEPT message, the UE_A 10 and/or the core network_A 90 establishes the PDN connection and/or the default bearer.

Further, according to the completion of the PDN connectivity procedure, the UE_A 10 and/or the core network_A 90 may determine the Mobility Type of the UE_A 10 corresponding to the established PDN connection and/or default bearer and/or the Mobility Type of the UE_A 10 corresponding to the established EPS bearer.

Note that, by the PDN connectivity procedure, the UE_A 10 can acquire the UE context illustrated in any of FIGS. 21(b) to 21(d) from the core network_A 90, and store the UE context.

More specifically, by the PDN connectivity procedure, the UE_A 10 can acquire the selected Mobility Type of the UE_A 10 from the core network_A 90, and store the Mobility Type in a UE context for each PDN connection and/or a UE context for each bearer.

In other words, based on the reception of the ACTIVATE DEFAULT EPS BEARER CONTEXT REQUEST message and/or the transmission of the ACTIVATE DEFAULT EPS BEARER CONTEXT ACCEPT message, the UE_A 10 can store the Mobility Type of the UE_A 10 selected in association with a PDN connection and/or a default bearer and/or an EPS bearer to be established and/or information relating to the Mobility Type.

More specifically, based on the reception of the ACTIVATE DEFAULT EPS BEARER CONTEXT REQUEST message and/or the reception of the ACTIVATE DEFAULT EPS BEARER CONTEXT ACCEPT message, the UE_A 10 can store the selected Mobility Type of the UE_A 10 and/or information relating the Mobility Type in a UE context for each PDN connection and/or a UE context for each bearer.

Note that the information relating to the Mobility Type may be the second identification information and/or the fourth identification information and/or the sixth identification information and/or the eighth identification information.

By the PDN connectivity procedure, the MME_A 40 can store the selected Mobility Type of the UE_A 10 in an MME context for each PDN connection and/or an MME context for each EPS bearer.

In other words, based on the reception of the ACTIVATE DEFAULT EPS BEARER CONTEXT REQUEST message and/or the reception of the ACTIVATE DEFAULT EPS BEARER CONTEXT ACCEPT message, the MME_A 40 can store the Mobility Type of the UE_A 10 selected in association with a PDN connection and/or a default bearer to be established and/or information relating to the Mobility Type.

More specifically, based on the reception of the ACTIVATE DEFAULT EPS BEARER CONTEXT REQUEST message and/or the reception of the ACTIVATE DEFAULT EPS BEARER CONTEXT ACCEPT message, the MME_A 40 can store the selected Mobility Type of the UE_A 10 and/or information relating the Mobility Type in an MME context for each PDN connection and/or an MME context for each EPS bearer.

By the PDN connectivity procedure, the SGW_A 35 and/or the PGW_A 30 can store the selected Mobility Type of the UE_A 10 in an EPS bearer context for each PDN connection and/or an EPS bearer context for each EPS bearer.

Note that the UE_A 10 may perform the PDN connectivity procedure described above multiple times to establish multiple PDN connections. At this time, respective pieces of identification information determined in the PDN connectivity procedures to be transmitted and/or received may differ in the PDN connectivity procedures.

For example, an APN, an IP address, and a bearer ID may be information that differ in the PDN connections. Further, part or all of the first to tenth identification information may be information that differ in the PDN connections.

By the PDN connection described above, the Mobility Type for the UE A 10 or a Mobility Type for a PDN connection established by the UE_A 10 can be determined.

1.3.1.1. Modified Examples of PDN Connectivity Procedure

Regarding the core network_A 90 in the PDN connectivity procedure example described above, a PDN connectivity procedure is described for a case adopting a core network configured to include the MME_A 40, the SGW_A 35, and the PGW_A 30 described with reference to FIGS. 2A and 2B; however, the core network_A 90 may be configured to include different control devices that are other than the MME_A 40, the SGW_A 35, and the PGW_A 30.

In this case, an NAS message, such as the PDN connectivity request message or the ACTIVATE DEFAULT EPS BEARER CONTEXT ACCEPT message described in the present procedure and transmitted by the UE_A 10, is received not by the MME_A 40 but a control device in the core network_A 90.

Accordingly, the reception and the processes of the NAS message by the MME_A 40 in the above description can be replaced with those performed by the control device in the core network_A 90.

Furthermore, the transmission and the process of the NAS message such as the ACTIVATE DEFAULT EPS BEARER CONTEXT REQUEST message or the like by the MME_A 40 in the above description can be replaced with those performed by the control device in the core network_A 90.

1.3.2. Mobility Type Change Procedure Example

First, an example of a Mobility Type change procedure will be described. Note that the Mobility Type change procedure is a procedure initiated by the UE_A 10 and/or the core network_A 90 to start. In other words, the Mobility Type change procedure may be a procedure initiated by the UE_A 10 to start and a procedure initiated by the MME_A 40 and/or the PGW_A 30 to start.

Note that the Mobility Type change procedure is a procedure for the UE_A 10 and/or the MME_A 40 and/or the PGW_A 30 to change a Mobility Type of the UE_A 10.

Note that start of the Mobility Type change procedure by the UE_A 10 and/or the MME_A 40 and/or the PGW_A 30 may correspond to the timing at which the attach procedure and/or the PDN connectivity procedure is completed. Regardless of the above, the UE_A 10 and/or the MME_A 40 and/or the PGW_A 30 may start the Mobility Type change procedure at an arbitrary timing provided that the UE_A 10 is connected to the core network_A 90.

Note that a trigger to start the Mobility Type change procedure may be an operation of the UE_A 10, the operator policy, or the subscriber information.

More specifically, a trigger to start the Mobility Type change procedure initiated by the UE_A 10 may be based on an operation of the UE_A 10.

A trigger to start the Mobility Type change procedure initiated by the core network_A 90 may be based on the network policy of the operator or the subscriber information, rather than being based on reception of a bearer resource modification request message transmitted by the UE_A 10.

Due to the completion of the Mobility Type change procedure, the UE_A 10 and/or the MME_A 40 and/or the PGW_A 30 become able to perform handover based on a new Mobility Type.

Note that below, details will be described of the Mobility Type change procedure initiated by the UE_A 10 as a first Mobility Type change procedure example. Further, details will be described of the Mobility Type change procedure initiated by the core network_A 90 as a second Mobility Type change procedure example.

1.3.2.1. First Mobility Type Change Procedure Example

The first Mobility Type change procedure is a Mobility Type change procedure initiated by the UE_A 10.

Figure 24:
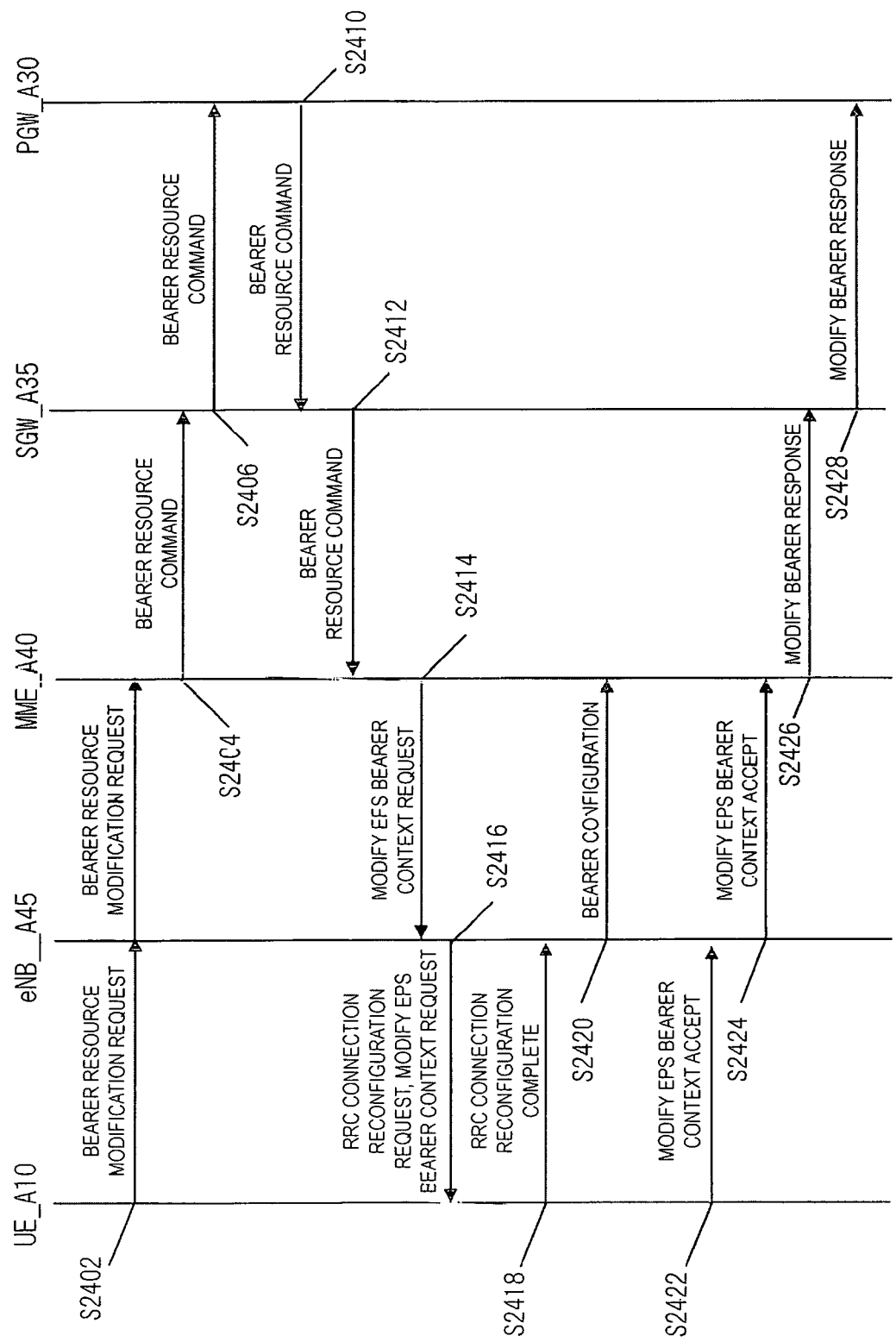
FIG. 24 is a diagram illustrating a first Mobility Type change procedure example.

Examples of steps of the first Mobility Type change procedure will be described below with reference to FIG. 24.

First, the UE_A 10 transmits a bearer resource modification request message to the MME_A 40 (S2402). Note that the UE_A 10 may transmit the bearer resource modification request message to the eNB_A 45, and the transmitted bearer resource modification request message may be transferred to the MME_A 40 via the eNB 45.

The UE_A 10 may include at least the ninth identification information in the bearer resource modification request message. By transmitting the bearer resource modification request message while including the ninth identification information, the UE_A 10 may request change of the Mobility Type of the UE_A 10 or request a Mobility Type of the UE_A 10 after the requested change.

Note that the ninth identification information may be information indicating a different Mobility Type from the Mobility Type indicated by the second identification information and/or the fourth identification information and/or the sixth identification information that the UE_A 10 has acquired from the core network_A 90.

For example, the UE_A 10 may request change of the Mobility Type of the UE_A 10 to any type from among the first to seventh types and/or a type obtained by combining any of the first to seventh types, or may request change of the Mobility Type to a type other than the first to seventh types instead of any type from among the first to seventh types.

The MME_A 40 receives the bearer resource modification request message. Further, based on the reception of the bearer resource modification request message, the MME_A 40 acquires the ninth identification information.

Based on information included in the bearer resource modification request message and/or the subscriber information and/or the operator policy and/or the identification information held by the MME_A 40, the MME_A 40 may determine change of the Mobility Type with respect to the UE_A 10 and/or a Mobility Type of the UE_A 10 after the change.

For example, the MME_A 40 may determine the Mobility Type indicated by the ninth identification information as the Mobility Type of the UE_A 10 after the change.

Instead of the Mobility Type indicated by the ninth identification information, the MME_A 40 may determine a default Mobility Type and/or a Mobility Type based on the subscriber information or the operator policy as the Mobility Type of the UE_A 10 after the change.

Note that the MME_A 40 may indicate any type from among the first to seventh types and/or a type obtained by combining any of the first to seventh types as the Mobility Type of the UE_A 10.

The MME_A 40 may indicate a type other than the first to seventh types, instead of any type from among the first to seventh types, as the Mobility Type of the UE_A 10.

Note that the Mobility Type of the UE_A 10 may be a Mobility Type corresponding to the PDN connection, a Mobility Type corresponding to the default bearer, or a Mobility Type corresponding to the EPS bearer.

The MME_A 40 may transmit the Mobility Type of the UE_A 10 after the change while being included in the tenth identification information.

Note that a method of changing the Mobility Type of the UE_A 10 is not limited to the above.

Based on the reception of the bearer resource modification request message and/or the determination of a Mobility Type, the MME_A 40 transmits a bearer resource command message to the SGW_A 35 (S2404).

The MME_A 40 may transmit at least the ninth identification information and/or the tenth identification information while being included in the bearer resource command message.

Here, in the description above, the MME_A 40 is described as determining change of the Mobility Type of the UE_A 10, but in place of the MME_A 40, the PGW_A 30 may determine the change of the Mobility Type of the UE_A 10. In this case, the MME_A 40 may transmit the bearer resource command message without including the tenth identification information.

The SGW_A 35 receives the bearer resource command message. Further, based on the reception of the bearer resource command message, the SGW_A 35 acquires the ninth identification information and/or the tenth identification information.

Based on the reception of the bearer resource command message, the SGW_A 35 transmits the bearer resource command message to the PGW_A 30 (S2406).

The SGW_A 35 may transmit at least the ninth identification information and/or the tenth identification information while being included in the bearer resource command message.

The PGW_A 30 receives the bearer resource command message. Further, based on the reception of the bearer resource command message, the PGW_A 30 acquires the ninth identification information and/or the tenth identification information.

Based on information included in the bearer resource command message and/or the subscriber information and/or the operator policy and/or the identification information held by the PGW_A 30, the PGW_A 30 may determine change of a Mobility Type with respect to the UE_A 10 and/or a Mobility Type of the UE_A 10 after the change.

For example, the PGW A 30 may determine the Mobility Type indicated by the ninth identification information as the Mobility Type of the UE_A 10 after the change.

Instead of the Mobility Type indicated by the ninth identification information, the PGW_A 30 may determine the default Mobility Type and/or a Mobility Type based on the subscriber information or the operator policy as a Mobility Type of the UE_A 10 after the change.

Note that the PGW_A 30 may indicate any type from among the first to seventh types and/or a type obtained by combining any of the first to seventh types as the Mobility Type of the UE_A 10.

The PGW_A 30 may indicate a type other than the first to seventh types instead of any type from among the first to seventh types as the Mobility Type of the UE_A 10.

Note that the Mobility Type of the UE_A 10 may be a Mobility Type corresponding to the PDN connection, a Mobility Type corresponding to the default bearer, or a Mobility Type corresponding to the EPS bearer.

The PGW_A 30 may transmit the Mobility Type of the UE_A 10 after the change while being included in the tenth identification information.

Note that a method of changing the Mobility Type of the UE_A 10 is not limited to the above.

Here, in the description above, a case is described that the PGW_A 30 determines change of the Mobility Type of the UE_A 10, but in a case that the MME_A 40 determines the change of the Mobility Type of the UE_A 10, the PGW_A 30 may not determine the change of the Mobility Type of the UE_A 10.

In other words, in the case that the PGW_A 30 has received the tenth identification information, the PGW_A 30 may not determine change of the Mobility Type of the UE_A 10.

Based on the reception of the bearer resource command message and/or the determination of a Mobility Type, the PGW_A 30 transmits an update bearer request message to the SGW_A 35 (S2410).

The PGW_A 30 may include at least the tenth identification information in the update hearer request message.

Note that the update bearer request message may be a response message corresponding to the bearer resource command message.

The SGW_A 35 receives the update bearer request message. Further, based on the reception of the update bearer request message, the SGW_A 35 acquires the tenth identification information.

Based on the reception of the update bearer request message, the SGW_A 35 transmits the update bearer request message to the MME_A 40 (S2412).

The SGW_A 35 may include at least the tenth identification information in the update bearer request message.

The MME_A 40 receives the update bearer request message. Further, based on the reception of the update bearer request message, the MME_A 40 acquires the tenth identification information.

Based on the reception of the update bearer request message, the MME_A 40 transmits a Modify EPS bearer context request message to the eNB_A 45 (S2414).

The MME_A 40 may include at least the tenth identification information in the Modify EPS bearer context request message.

Note that the Modify EPS bearer context request message may be a response message to the bearer resource modification request message.

The eNB_A 45 receives the Modify EPS bearer context request message and transmits to the UE_A 10 an RRC message including the Modify EPS bearer context request message (S2416). Note that the RRC message may be an RRC connection reconfiguration request message.

The UE_A 10 receives the RRC message including the Modify EPS bearer context request message. Further, in a case that the tenth identification information is included in the Modify EPS bearer context request message, the UE_A 10 acquires respective pieces of identification information.

Based on the reception of the Modify EPS bearer context request message and/or the information included in the Modify EPS bearer context request message, the UE_A 10 may identify approval of change of the Mobility Type of the UE_A 10 and/or a Mobility Type of the UE_A 10 after the change.

More specifically, based on the reception of the tenth identification information, the UE_A 10 may identify that change of the Mobility Type of the UE_A 10 has been approved.

The UE_A 10 may identify the Mobility Type indicated by the received tenth identification information as the Mobility Type of the UE_A 10 after the change.

In order to respond to the received RRC message, the UE_A 10 transmits the RRC message to the eNB_A 45 (S2418). The RRC message may be an RRC connection reconfiguration complete message.

The eNB_A 45 receives an RRC connection reconfiguration message, and transmits a bearer configuration message to the MME_A 40 based on the reception (S2420).

In addition, based on the reception of the Modify EPS bearer context request message, the UE_A 10 transmits the RRC message including a modify EPS bearer context accept message to the eNB_A 45 (S2422). Here, the modify EPS bearer context accept message may be a response message to the Modify EPS bearer context request message.

Note that the RRC message to be transmitted while including the modify EPS bearer context accept message may be a Direct Transfer message.

The eNB_45 receives the RRC message including the modify EPS bearer context accept message and transmits the modify EPS bearer context accept message to the MME A 40 (S2424).

The MME_A 40 receives the modify EPS bearer context accept message.

Based on the reception of the modify EPS bearer context accept message, the MME_A 40 may transmit a modify bearer response message to the SGW_A 35 (S2426).

Note that the modify bearer response message may be a response message to the modify bearer request message.

The SGW_A 35 receives the modify bearer response message.

Based on the reception of the modify bearer response message, the SGW_A 35 transmits the modify bearer response message to the PGW_A 30 (S2428).

The PGW_A 30 receives the modify bearer response message.

By the above-described steps, the UE_A 10 and/or the core network_A 90 completes the first Mobility Type change procedure. According to the completion of the first Mobility Type change procedure, the UE_A 10 and/or the core network_A 90 may change the Mobility Type of the UE_A 10.

Note that by the first Mobility Type change procedure, the UE_A 10 can store the received Mobility Type of the UE_A 10 after the change in any UE context described with reference to any of FIGS. 21(b) to 21(d).

More specifically, by the first Mobility Type change procedure, the UE_A 10 can acquire the Mobility Type of the UE_A 10 after the change from the core network_A 90, and store the Mobility Type in a UE context for each PDN connection and/or a UE context for each bearer.

By the first Mobility Type procedure, the MME_A 40 can store the Mobility Type of the UE_A 10 after the change in an MME context for each PDN connection and/or an MME context for each bearer.

By the first Mobility Type procedure, the SGW_A 35 and/or the PGW_A 30 can store the Mobility Type of the UE_A 10 after the change in an EPS bearer context for each PDN connection and/or an EPS bearer context for each EPS bearer.

1.3.2.2 Second Mobility Type Change Procedure Example

The second Mobility Type change procedure is a Mobility Type change procedure initiated by the core network_A 90.

Figure 25:
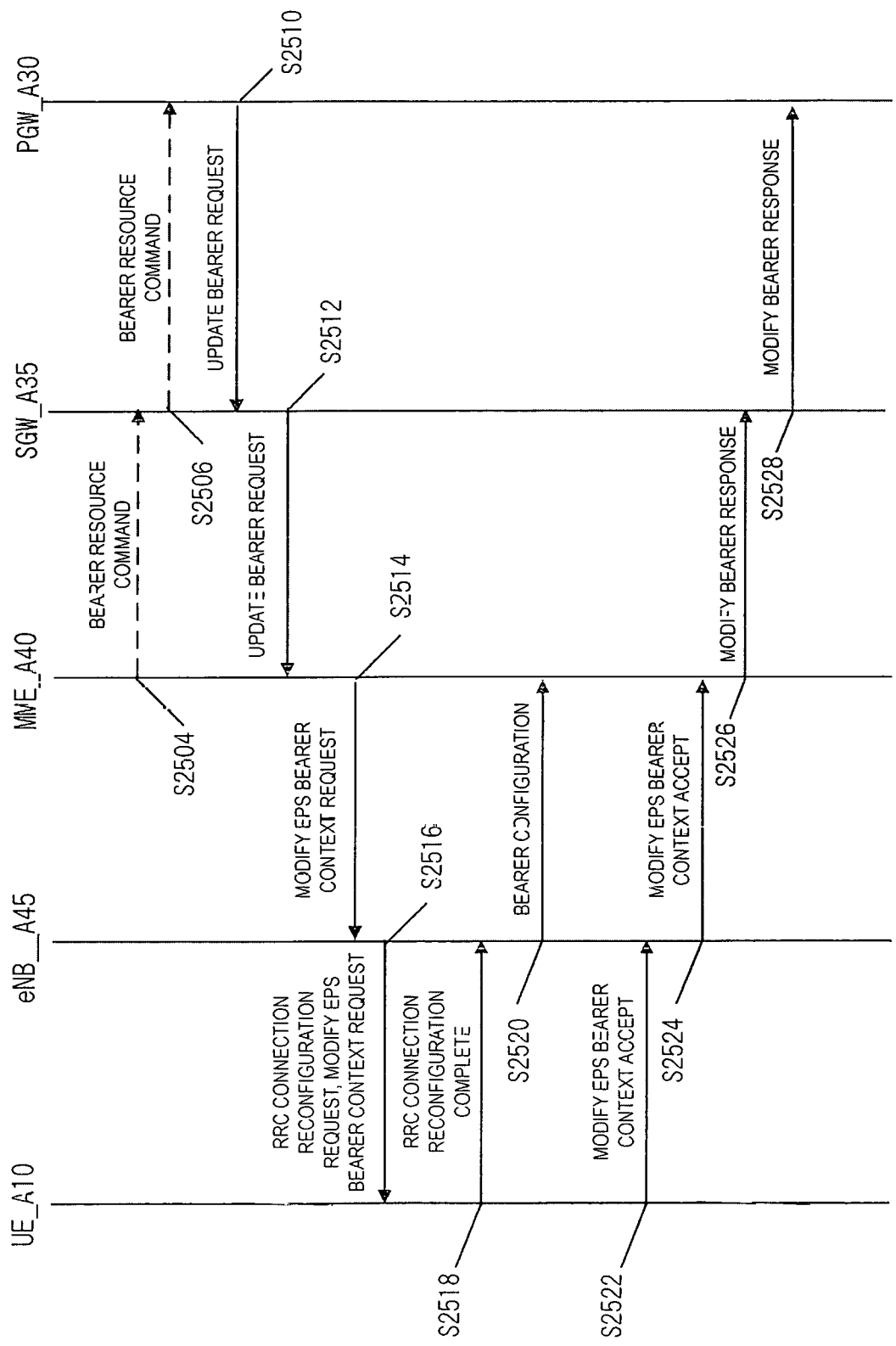
FIG. 25 is a diagram illustrating a second Mobility Type change procedure example.

Examples of steps of the second Mobility Type change procedure will be described below with reference to FIG. 25.

The MME_A 40 may transmit a bearer resource command message to the SGW_A 35 (S2504).

The MME_A 40 may transmit at least the ninth identification information while being included in the bearer resource command message.

By transmitting the bearer resource command message while including the ninth identification information, the MME_A 40 may request change of the Mobility Type of the UE_A 10 or indicate a Mobility Type of the UE_A 10 after the requested change.

For example, the MME_A 40 may request change of the Mobility Type of the UE_A 10 to any type from among the first to seventh types and/or a type obtained by combining any of the first to seventh types, or may request change of the Mobility Type to a type other than the first to seventh types instead of any type from among the first to seventh types.

The SGW_A 35 receives the bearer resource command message. Further, based on the reception of the bearer resource command message, the SGW_A 35 acquires the ninth identification information.

Based on the reception of the bearer resource command message, the SGW_A 35 may transmit the bearer resource command message to the PGW_A 30 (S2506).

The SGW_A 35 may transmit at least the ninth identification information while being included in the bearer resource command message.

The PGW_A 30 receives the bearer resource command message. Further, based on the reception of the bearer resource command message, the PGW_A 30 acquires the ninth identification information.

Based on the reception of the bearer resource command message, the PGW_A 30 transmits an update bearer request message to the SGW_A 35 (S2510).

The PGW_A 30 may include at least the ninth identification information in the update bearer request message.

Note that the PGW_A 30 may transmit the update bearer request message to the SGW_A 35 based on the operator policy and the subscriber information, not based on the reception of the bearer resource command message.

In other words, the PGW_A 30 may start the second Mobility Type change procedure, based on the operator policy or the subscriber information, not based on the reception of the bearer resource command message.

In this case, the bearer resource command message that the MME_A 40 and/or the SGW_A 35 and/or the PGW_A 30 transmit and/or receive can be omitted.

By transmitting the update bearer request message including the ninth identification information, the PGW_A 30 may request change of the Mobility Type of the UE_A 10 or indicate a Mobility Type of the UE_A 10 after the requested change.

For example, the PGW_A 30 may request change of the Mobility Type of the UE_A 10 to any type from among the first to seventh types and/or a type obtained by combining any of the first to seventh types, or may request change of the Mobility Type to a type other than the first to seventh types instead of any type from among the first to seventh types.

The SGW_A 35 receives the update bearer request message. Further, based on the reception of the update bearer request message, the SGW_A 35 acquires the ninth identification information.

Based on the reception of the update bearer request message, the SGW_A 35 transmits the update bearer request message to the MME_A 40 (S2512).

The SGW_A 35 may include at least the ninth identification information in the update bearer request message.

The MME_A 40 receives the update bearer request message. Further, based on the reception of the update bearer request message, the MME_A 40 acquires the ninth identification information.

Based on the reception of the update bearer request message, the MME_A 40 transmits a Modify EPS bearer context request message to the eNB_A 45 (S2514).

The MME_A 40 may include at least the ninth identification information in the Modify EPS bearer context request message.

By transmitting the Modify EPS bearer context request message including the ninth identification information, the MME_A 40 may request change of the Mobility Type of the UE_A 10 or indicate a Mobility Type of the UE_A 10 after the requested change.

The ninth identification information may be information indicating a different Mobility Type from the Mobility Type indicated by the second identification information and/or the fourth identification information and/or the sixth identification information that the MME_A 40 and/or the PGW_A 30 has previously transmitted to the UE_A 10.

Further, the ninth identification information may be information indicating a different Mobility Type from the Mobility Type indicated by the second identification information and/or the fourth identification information and/or the sixth identification information that the MME_A 40 and/or the PGW_A 30 has stored.

The eNB_A 45 receives the Modify EPS bearer context request message and transmits to the UE_A 10 an RRC message in which the Modify EPS bearer context request message is included (S2516). Note that the RRC message may be an RRC connection reconfiguration request message.

The UE_A 10 receives the RRC message including the Modify EPS bearer context request message. Further, in a case that the ninth identification information is included in the Modify EPS bearer context request message, the UE_A 10 acquires respective pieces of identification information.

Based on the reception of the Modify EPS bearer context request message and/or the information included in the Modify EPS bearer context request message and/or the identification information held by the UE_A 10, the UE_A 10 may determine change of the Mobility Type of the UE_A 10 and/or a Mobility Type of the UE_A 10 after the change.

For example, the UE_A 10 may determine the Mobility Type indicated by the ninth identification information as a Mobility Type of the UE_A 10 after the change.

Alternatively, in place of the Mobility Type indicated by the ninth identification information, the UE_A 10 may determine a Mobility Type desired by the UE_A 10 as a Mobility Type of the UE_A 10 after the change.

Note that the UE_A 10 may indicate any type from among the first to seventh types and/or a type obtained by combining any of the first to seventh types as a Mobility Type of the UE_A 10.

Further, the UE_A 10 may indicate a type other than the first to seventh types instead of any type from among the first to seventh types.

Note that the Mobility Type of the UE_A 10 may be a Mobility Type corresponding to the PDN connection or a Mobility Type corresponding to the default bearer.

The UE_A 10 may transmit the Mobility Type of the UE_A 10 after the change while being included in the tenth identification information.

Note that a method of changing the Mobility Type of the UE_A 10 is not limited to the above.

In order to respond to the received RRC message, the UE_A 10 transmits the RRC message to the eNB_A 45 (S2518). The RRC message may be an RRC connection reconfiguration complete message.

The eNB_A 45 receives an RRC connection reconfiguration message, and transmits a bearer configuration message to the MME_A 40 based on the reception (S2520).

Based on the reception of the Modify EPS bearer context request message, the UE_A 10 transmits the RRC message including a modify EPS bearer context accept message to the eNB_A 45 (S2522).

The UE_A 10 may transmit at least the tenth identification information while being included in the modify EPS bearer context accept message.

Here, the modify EPS bearer context accept message may be a response message to the Modify EPS bearer context request message.

Note that the RRC message to be transmitted while including the modify EPS bearer context accept message may be a Direct Transfer message.

The eNB_45 receives the RRC message including the modify EPS bearer context accept message and transmits the modify EPS bearer context accept message to the MME_A 40 (S2524).

The MME_A 40 receives the modify EPS bearer context accept message. Further, based on the reception of the modify EPS bearer context accept message, the MME_A 40 acquires the tenth identification information.

Based on the reception of the modify EPS bearer context accept message and/or the information included in the modify EPS bearer context accept message, the MME_A 40 may identify approval of change of the Mobility Type of the UE_A 10 and/or a Mobility Type of the UE_A 10 after the change.

More specifically, based on the reception of the tenth identification information, the MME_A 40 may identify that change of the Mobility Type of the UE_A 10 has been approved.

The MME_A 40 may identify the Mobility Type indicated by the received tenth identification information as a Mobility Type of the UE_A 10 after the change.

Based on the reception of the modify EPS bearer context accept message, the MME_A 40 transmits a modify bearer response message to the SGW_A 35 (S2526).

The MME_A 40 may transmit at least the tenth identification information while being included in the modify bearer response message.

Note that the modify bearer response message may be a response message to the modify bearer request message.

The SGW_A 35 receives the modify bearer response message. Further, based on the reception of the modify bearer response message, the SGW_A 35 acquires the tenth identification information.

Based on the reception of the modify bearer response message, the SGW_A 35 transmits the modify bearer response message to the PGW_A 30 (S2528).

The SGW_A 35 may transmit at least the tenth identification information while being included in the modify bearer response message.

The PGW_A 30 receives the modify bearer response message. Further, based on the reception of the modify bearer response message, the PGW_A 30 acquires the tenth identification information.

Based on the reception of the modify EPS bearer context accept message and/or the information included in the modify EPS bearer context accept message, the PGW_A 30 may identify approval of change of the Mobility Type of the UE_A 10 and/or a Mobility Type of the UE_A 10 after the change.

More specifically, based on the reception of the tenth identification information, the PGW_A 30 may identify that change of the Mobility Type of the UE_A 10 has been approved.

The PGW_A 30 may identify the Mobility Type indicated by the received tenth identification information as a Mobility Type of the UE_A 10 after the change.

By the above-described steps, the UE_A 10 and/or the core network_A 90 completes the second Mobility Type change procedure. According to the completion of the second Mobility Type change procedure, the UE_A 10 and/or the core network_A 90 may change the Mobility Type of the UE_A 10.

Note that by the second Mobility Type change procedure, the UE_A 10 can store the Mobility Type of the UE_A 10 after the change in any UE context described with reference to any of FIGS. 21(b) to 21(d).

More specifically, by the second Mobility Type change procedure, the UE_A 10 can store the Mobility Type of the UE_A 10 after the change in a UE context for each PDN connection and/or a UE context for each bearer.

Further, by the second Mobility Type change procedure, the MME_A 40 can acquire the Mobility Type of the UE_A 10 after the change from the UE_A 10 and store the Mobility Type in an MME context for each PDN connection and/or an MME context for each bearer.

By the second Mobility Type change procedure, the SGW_A 35 and/or the PGW_A 30 can acquire the Mobility Type of the UE_A 10 after the change from the UE_A 10 and store the Mobility Type in an EPS bearer context for each PDN connection and/or an EPS bearer context for each EPS bearer.

1.3.2.3. Modified Examples of Mobility Type Change Procedure

Regarding the core network_A 90 in the Mobility Type change procedure example described above, a transmission and/or reception method change procedure is described for a case adopting a core network configured to include the MME_A 40, the SGW_A 35, and the PGW_A 30 described with reference to FIGS. 2A and 2B; however, the core network_A 90 may be configured to include different devices from the MME_A 40, the SGW_A 35, and the PGW_A 30.

In this case, an NAS message, such as the bearer resource modification request message or the modify EPS bearer context accept message described in the present procedure and transmitted by the UE_A 10, is received not by the MME_A 40 but another device in the core network_A 90.

Accordingly, the reception and the processes of the NAS message by the MME_A 40 in the above description can be replaced with those performed by a device in the core network_A 90.

Furthermore, the transmission and the process of the NAS message such as the Modify EPS bearer context request message by the MME_A 40 in the above description can be replaced with those performed by the device in the core network_A 90.

1.3.3. Examples of Handover Procedure

The UE_A 10 and/or the core network_A 90 may perform a handover procedure, based on a Mobility Type of the UE_A 10.

For example, in a case that a connection is established by a Mobility Type supporting handover in an active mode, the UE_A 10 may perform a handover procedure and continue communication by switching the connection to a different base station.

Alternatively, in a case that a connection is established by a Mobility Type that does not allow handover in an active mode, the UE_A 10 may, in the handover procedure, receive a control message for disconnecting communication from the core network_A 90, for example, and perform disconnection from the PDN connection or detach from the core network_A 90. Note that in this case, the UE_A 10 may delete the UE context. Meanwhile, the MME_A 40 may delete the MME context for the UE_A 10.

For example, in the case that a connection is established by a Mobility Type supporting handover in an active mode, the UE_A 10 may perform the handover procedure and continue communication by switching the connection to a different base station.

Alternatively, in a case that a connection is established by a Mobility Type that does not allow handover in an active mode, the UE_A 10 may, in the handover procedure, receive a control message for disconnecting communication from the core network_A 90, for example, and perform disconnection from the PDN connection or detach from the core network_A 90. Note that in this case, the UE_A 10 may delete the UE context. Meanwhile, the MME_A 40 may delete the MME context for the UE_A 10.

In a case that a different Mobility Type has been determined for each PDN connection, the UE_A 10 may perform a different process for each PDN connection at the time of handover.

For example, for a PDN connection established by a Mobility Type that supports handover in an active mode, the UE_A 10 may perform a handover procedure and continue communication by switching the connection to a different base station.

Alternatively, for a PDN connection established by a Mobility Type that does not allow handover in an active mode, the UE_A 10 may, in the handover procedure, receive a control message for disconnecting communication from the core network_A 90, for example, and disconnect the PDN connection.

At this time, the core network_A 90 may transmit, while being included in the control message, information for identifying the PDN connection to be disconnected. Note that a control device in the core network_A 90 transmitting the control message may be the MME_A 40. The UE_A 10 may identify the PDN connection to be disconnected based on the received information.

Here, the information for identifying a PDN connection may be a bearer ID and/or an APN and/or an IP address, or the like.

Alternatively, information for identifying a PDN connection may be a Mobility Type. The UE_A 10 may receive a Mobility Type and select a PDN connection conforming to the received Mobility Type, based on the UE context.

Further, when disconnecting the PDN connection, the UE_A 10 may delete, from the UE context, information corresponding to the PDN connection to be disconnected. Meanwhile, the MME_A 40 may delete, in the MME context for the UE_A 10, information corresponding to the PDN connection to be disconnected.

For example, in the case that a connection is established by a Mobility Type supporting handover in an active mode, the UE_A 10 may perform the handover procedure and continue communication by switching the connection to a different base station.

Alternatively, in the case that a connection is established by a Mobility Type that does not allow handover in an active mode, the UE_A 10 may, in the handover procedure, receive a control message for disconnecting communication from the core network_A 90, for example, and perform disconnection from the PDN connection or detach from the core network_A 90. Note that in this case, the UE_A 10 may delete the UE context. Meanwhile, the MME_A 40 may delete the MME context for the UE_A 10.

Note that the control message for deleting a PDN connection and/or a control message for detach of the UE_A 10 described above may not be a control message that the core network_A 90 transmits to the UE_A 10 at the handover.

For example, such a control message may be a response message to a tracking area update request transmitted by the UE_A 10, a detach request message, or a delete bearer request message.

Further, in a case that a base station to which the UE_A 10 is connected has changed due to movement of the UE_A 10, the UE_A 10 may delete a Mobility Type that does not allow handover in an active mode and/or a PDN connection of a Mobility Type that does not allow handover in an idle mode. Further, in the deletion of the PDN connection, information corresponding to the PDN connection to be deleted, which is included in the UE context, may be deleted. Such information corresponding to the PDN connection may be a bearer ID, an IP address, an APN, and the like.

As described above, communication control corresponding to a Mobility Type may be performed.

2. Modified Example

A program running on each apparatus or device according to the present invention may be a program for controlling a Central Processing Unit (CPU) and the like to cause a computer to function so as to enable the functions of the embodiments of the present invention. Such a program or information used in the program is stored temporarily in a volatile memory such as a Random Access Memory (RAM), a non-volatile memory such as a flash memory, a Hard Disk Drive (HDD), or other storage device systems.

Note that a program for enabling the functions of the embodiments of the present invention may be recorded in a computer-readable recording medium. This program recorded in the recording medium may be read by a computer system to be performed, thereby enabling the functions. It is assumed that the "computer system" refers to a computer system built into a device, and the computer system includes an OS and hardware components such as a peripheral device. Further, the "computer-readable recording medium" may be a semiconductor recording medium, an optical recording medium, a magnetic recording medium, a medium that holds a program dynamically for a short period of time, or other computer-readable recording media.

Further, respective functional blocks or various characteristics of the apparatuses and devices used in the embodiments above may be implemented or performed by an electric circuit, for example by an integrated circuit or by multiple integrated circuits. An electric circuit designed to perform the functions described in this specification may include a general-purpose processor, a digital signal processor (DSP), an application specific integrated circuit (ASIC), a field programmable gate array (FPGA), or other programmable logic devices, discrete gates or transistor logic, discrete hardware components, or a combination of these. The general-purpose processor may be a microprocessor, or a processor of a known type, a controller, a micro-controller, or a state machine. The electric circuits described above may include digital circuits or analog circuits. Furthermore, in a case where with advances in semiconductor technology, a circuit integration technology with which the current integrated circuits are replaced appears, the present invention can also adopt a new integrated circuit based on the technology.

Note that the invention of the present patent application is not limited to the above-described embodiments. In the embodiments, the apparatuses have been described as examples, but the present invention is not limited to such apparatuses, and is applicable to a fixed-type or a stationary-type electronic apparatus installed indoors or outdoors, for example, a terminal apparatus or communication device such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described according to the embodiments is also included in the technical scope of the present invention.

REFERENCE SIGNS LIST

1 Communication system
5 PDN_A
10 UE_A
20 UTRAN_A
22 eNB (UTRAN)_A
24 RNC_A
25 GERAN_A
26 BSS_A
30 PGW_A
35 SGW_A
40 MME_A
45 eNB_A
50 HSS_A
55 AAA_A
60 PCRF_A
65 ePDG_A
70 WLAN ANa
72 WLAN APa
74 TWAG_A
75 WLAN ANb
76 WLAN APb
80 LTE AN_A
90 Core network_A
100 CIOT AN_A

The invention claimed is:

1. A User Equipment (UE) comprising:
a controller; and
transmission and/or reception circuit,
wherein
the transmission and/or reception circuitry is configured, in a communication path establishment procedure, to receive a message containing an Access Point Name (APN) from a core network, the APN being information corresponding to information indicating that a communication path for performing transmission and/or reception of user data is released in a case that the UE is out of a specific area,
the controller is configured, in the communication path establishment procedure, to establish the communication path for performing the transmission and/or reception of the user data between the UE and a data network associated with the APN, and
the controller is configured to release the communication path in a case that the UE moves out of the specific area.

2. The UE according to claim 1, the specific area is an area constituted by a base station apparatus.

3. A communication method performed by a User Equipment (UE), the communication method comprising:
receiving, in a communication path establishment procedure, a message containing an Access Point Name (APN) from a core network, the APN being information corresponding to information indicating that a communication path for performing transmission and/or reception of user data is released in a case that the UE is out of a specific area;
establishing, in the communication path establishment procedure, the communication path for performing the transmission and/or reception of the user data between the UE and a data network associated with the APN; and
releasing the communication path in a case that the UE moves out of the specific area.

4. The communication method according to claim 3, the specific area is an area constituted by a base station apparatus.

5. A core network apparatus comprising:
a controller; and
transmission and/or reception circuitry,
wherein
the transmission and/or reception circuitry is configured, in a communication path establishment procedure, to transmit a message containing an Access Point Name (APN) to a User Equipment (UE), the APN being information corresponding to information indicating that a communication path for performing transmission and/or reception of user data is released in a case that the UE is out of a specific area,
the controller is configured, in the communication path establishment procedure, to establish the communication path for performing the transmission and/or reception of the user data between the UE and a data network associated with the APN, and
the controller is configured to release the communication path in a case that the UE moves out of the specific area.

6. The core network apparatus according to claim 5, the specific area is an area constituted by a base station apparatus.

7. A communication method performed by a core network, the communication method comprising:

transmitting, in a communication path establishment procedure, a message containing an Access Point Name (APN) to a User Equipment (UE), the APN being information corresponding to information indicating that a communication path for performing transmission and/or reception of user data is released in a case that the UE is out of a specific area;

establishing, in the communication path establishment procedure, the communication path for performing the transmission and/or reception of the user data between the UE and a data network associated with the APN; and releasing the communication path in a case that the UE moves out of the specific area.

8. The communication method according to claim 7, the specific area is an area constituted by a base station apparatus.

* * * * *

UNITED STATES PATENT AND TRADEMARK OFFICE
CERTIFICATE OF CORRECTION

| | |
|---|---|
| PATENT NO. | : 11,064,541 B2 |
| APPLICATION NO. | : 15/998750 |
| DATED | : July 13, 2021 |
| INVENTOR(S) | : Yudai Kawasaki et al. |

Page 1 of 1

It is certified that error appears in the above-identified patent and that said Letters Patent is hereby corrected as shown below:

In the Claims

At Column 50, Line 28, in Claim 1:
Please change:
"reception circuit,"
To:
-- reception circuitry, --

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*